(12) United States Patent
Ananthanarayanan et al.

(10) Patent No.: US 11,860,975 B2
(45) Date of Patent: *Jan. 2, 2024

(54) ALLOCATING COMPUTING RESOURCES DURING CONTINUOUS RETRAINING

(71) Applicant: Microsoft Technology Licensing, LLC, Redmond, WA (US)

(72) Inventors: Ganesh Ananthanarayanan, Seattle, WA (US); Yuanchao Shu, Kirkland, WA (US); Tsu-wang Hsieh, Redmond, WA (US); Nikolaos Karianakis, Sammamish, WA (US); Paramvir Bahl, Bellevue, WA (US); Romil Bhardwaj, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,736

(22) Filed: Sep. 20, 2022

(65) Prior Publication Data

US 2023/0030499 A1 Feb. 2, 2023

Related U.S. Application Data

(63) Continuation of application No. 17/124,172, filed on Dec. 16, 2020, now Pat. No. 11,461,591.

(51) Int. Cl.
*G06F 9/50* (2006.01)
*G06N 20/00* (2019.01)
*G06F 18/214* (2023.01)
*G06V 20/58* (2022.01)

(52) U.S. Cl.
CPC ........ *G06F 18/2148* (2023.01); *G06F 9/5038* (2013.01); *G06N 20/00* (2019.01); *G06V 20/58* (2022.01)

(58) Field of Classification Search
None
See application file for complete search history.

(56) References Cited

U.S. PATENT DOCUMENTS 11,295,165 B1 * 4/2022 Agarwal ............... G06F 18/217
11,461,591 B2 * 10/2022 Ananthanarayanan ......................
G06F 9/5038
2020/0302292 A1 * 9/2020 Tseng ....................... G06N 3/08

* cited by examiner

*Primary Examiner* — Dov Popovici

(57) ABSTRACT

Provided are aspects relating to methods and computing devices for allocating computing resources and selecting hyperparameter configurations during continuous retraining and operation of a machine learning model. In one example, a computing device configured to be located at a network edge between a local network and a cloud service includes a processor and a memory storing instructions executable by the processor to operate a machine learning model. During a retraining window, a selected portion of a video stream is selected for labeling. At least a portion of a labeled retraining data set is selected for profiling a superset of hyperparameter configurations. For each configuration of the superset of hyperparameter configurations, a profiling test is performed. The profiling test is terminated, and a change in inference accuracy that resulted from the profiling test is extrapolated. Based upon the extrapolated inference accuracies, a set of selected hyperparameter configurations is output.

20 Claims, 31 Drawing Sheets

Class Distribution

FIG. 2D Window 2 snapshot

Effect of Hyperparameters

Thief Scheduler

Thief Scheduler

Cityscapes

Waymo

Cityscapes

Waymo

Urban Traffic

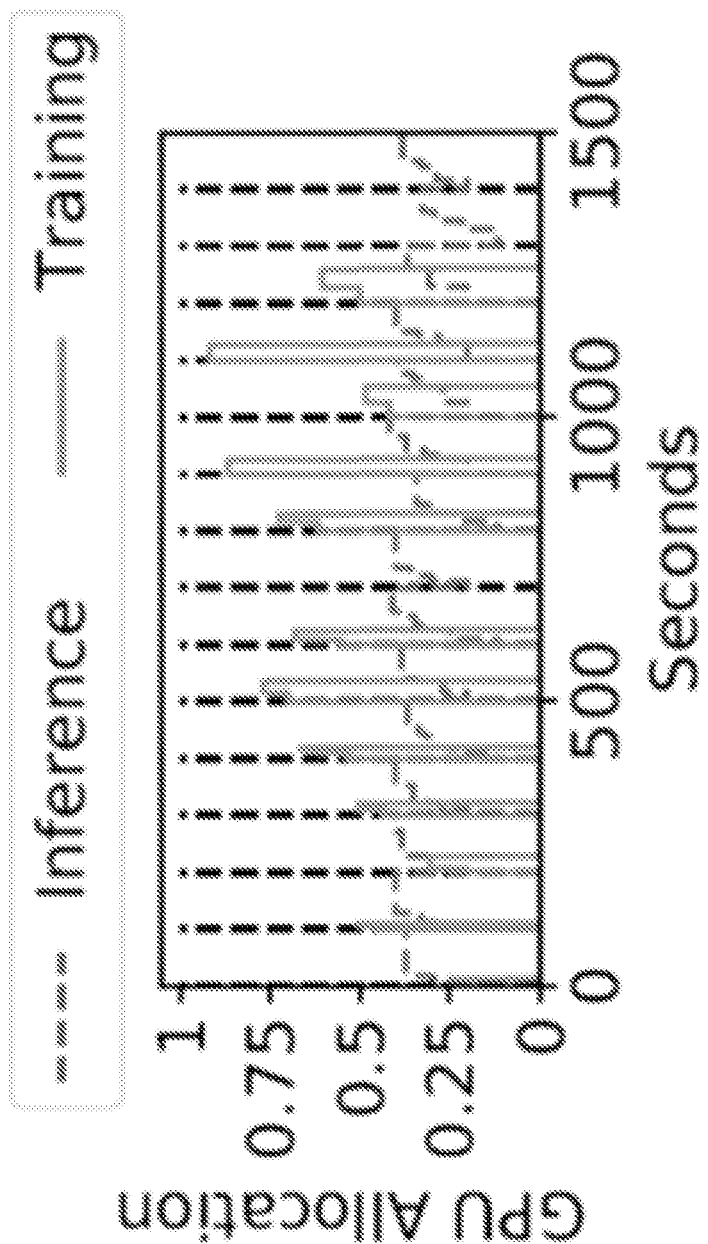

Impact of a controlled error ε to accuracy estimates

ALLOCATING COMPUTING RESOURCES DURING CONTINUOUS RETRAINING

CROSS-REFERENCE TO RELATED APPLICATIONS

This application is a continuation application of U.S. patent application Ser. No. 17/124,172, filed on Dec. 16, 2020, now U.S. Pat. No. 11,461,591, the entire disclosure of which is hereby incorporate by reference in its entirety.

BACKGROUND

Compressed machine learning models may be deployed to make inferences on edge computing devices in applications such as video analytics. Such models can be used to analyze a wide variety of types of video data, including but not limited to security camera data and traffic camera data. The use of a compressed machine learning model allows the models to be efficiently deployed on systems with more limited compute resources, such as edge devices, as opposed to data center computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to allocating computing resources and selecting hyperparameter configurations during continuous retraining and operation of a machine learning model, the continuous retraining and operation comprising a plurality of jobs including, for each video stream of one or more video streams, an inference job and a retraining job. In one example, a computing device configured to be located at a network edge between a local network and a cloud service comprises a processor and a memory storing instructions executable by the processor. The instructions are executable to operate a machine learning model configured to analyze video, and to retrain the machine learning model. During a retraining window, a selected portion of a received video stream is selected for labeling. A labeled retraining data set is obtained for the portion of the video stream selected for labeling. The labeled retraining data set comprises labels for one or more objects identified in the portion of the video stream. At least a portion of the labeled retraining data set is selected for profiling of a superset of hyperparameter configurations. For each configuration of the superset of hyperparameter configurations, the instructions are executable to perform a profiling test of the machine learning model using the configuration for a selected number of training epochs, terminate the profiling test after the selected number of training epochs and prior to convergence of the machine learning model, and extrapolate a change in inference accuracy of the machine learning model that resulted from the profiling test to form an extrapolated inference accuracy for the configuration tested. Based upon the extrapolated inference accuracies determined for the superset of hyperparameter configurations, a set of selected hyperparameter configurations is output comprising a plurality of hyperparameter configurations for possible use in retaining the machine learning model.

Another example provides, on a computing device comprising a machine learning model configured to analyze video data, a method for allocating computing resources and selecting hyperparameter configurations during continuous retraining and operation of the machine learning model, the continuous retraining and operation comprising a plurality of jobs including, for each video stream of one or more video streams, an inference job and a retraining job. The method comprises storing an initial resource allocation for the plurality of jobs as a stored resource allocation, storing an initial hyperparameter configuration as a stored hyperparameter configuration, and storing an inference accuracy for the initial hyperparameter configuration and the initial resource allocation as a stored inference accuracy. For the plurality of jobs, the method comprises iteratively: designating a selected job as a thief, and designating one or more other jobs each as a victim; for the thief and the one or more victims, reallocating an amount of computing resources from each victim to the thief to form an updated allocation; testing a plurality of hyperparameter configurations for the machine learning model using the updated allocation to determine an updated inference accuracy; and when the updated inference accuracy is more accurate than the stored inference accuracy, then storing a selected hyperparameter configuration that produced the updated inference accuracy as the stored hyperparameter configuration, storing the updated inference accuracy as the stored inference accuracy, and storing the updated allocation as the stored resource allocation. The method comprises, after iterating through each job of the plurality of jobs as the thief, during a retraining window, retraining the machine learning model and making inferences with the machine learning model using the stored resource allocation and the stored hyperparameter configuration.

Another example provides a computing device configured to be located at a network edge between a local network and a cloud service. The computing device comprises a processor, and a memory storing instructions executable by the processor to perform continuous retraining and operation of a machine learning model configured to analyze video, the continuous retraining and operation comprising a plurality of jobs including, for each video stream of one or more video streams, a retraining job and an inference job. The instructions are executable to receive a video stream, during a retraining window, select a portion of the video stream for labeling, obtain a labeled retraining data set for the portion of the video stream that was selected for labeling. The labeled retraining data set comprises labels for one or more objects identified in the portion of the video stream. One or more of a hyperparameter configuration and a computing resource allocation are selected to use for the continuous retraining and operation of the machine learning model by testing one or more of a plurality of hyperparameter configurations and a plurality of computing resource allocations using an average inference accuracy over the retraining window as a testing metric. The machine learning model is retrained and operated using the one or more of the hyperparameter configuration and the computing resource allocation selected.

BRIEF DESCRIPTION OF THE DRAWINGS

FIGS. 2C and 2D show photographs taken from the retraining data illustrating how objects within a class vary in frequency and appearance over time in the sample video data set of FIG. 2A.

FIGS. 9A and 9B show a plot of resource allocation for different video streams over several retraining windows, and illustrates the dynamic allocation of resources for different streams.

DETAILED DESCRIPTION

Figure 1:
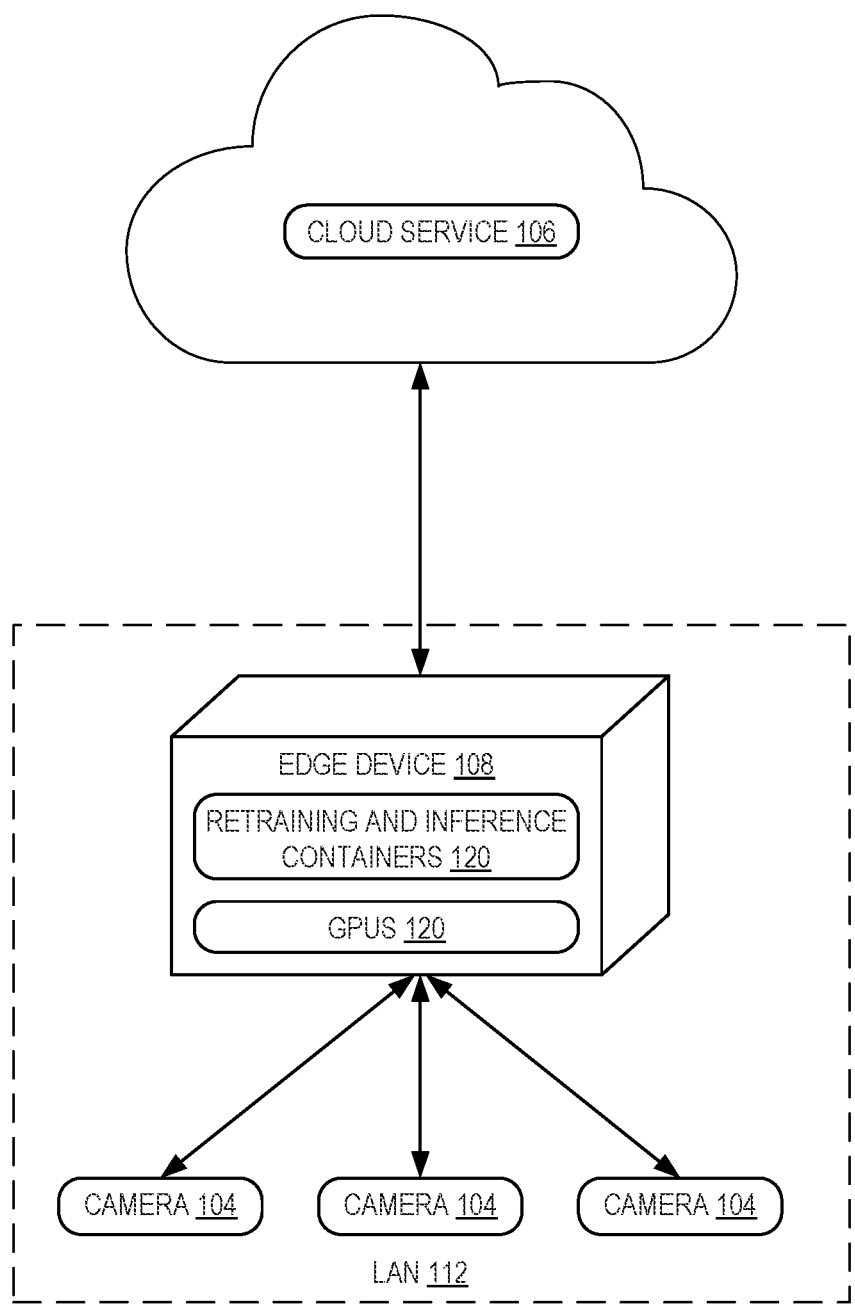
FIG. 1 shows one example of an edge device deployment for video analytics.

As introduced above, machine learning models may be deployed to support making inferences on edge computing devices. For example, video analytics applications may use edge computing servers for the analytics of the videos, helping preserve bandwidth and privacy. In some examples, video analytics applications, such as for urban mobility and smart cars, are powered by deep neural network (DNN) models for object detection and classification. While the following examples are provided with reference to video analytics, it will also be appreciated that the methods and devices described herein may be applied in any other suitable machine learning context.

In such video analytics deployments, video data is often streamed to edge servers located on premise, as opposed to being streamed to a data center accessible via a wide area network. Edge computation may be desirable for video analytics, as it does not use expensive network links to stream videos to the cloud, while also helping ensure privacy of the videos (e.g., some jurisdictions may mandate against streaming videos from traffic cameras and other surveillance cameras to cloud-based computing systems, such as data centers).

However, compared to data centers, edge computing devices can be provisioned with relatively weak computing resources. For example, an edge server may have less powerful graphics processing units (GPUs) than a cloud server. This can be exacerbated by mismatch between the growth rates of computing demands of models and the compute cycles of processors.

Accordingly, edge deployments may utilize model compression, in which compressed deep neural networks (DNNs) are initially trained on representative data (e.g. data from each video stream that will be used for making inferences with the model). However, in the field, the compressed DNNs may be affected by data drift. Data drift can occur when live video data diverges significantly from the data that was used for training. For example, cameras in streets and smart cars encounter varying scenes over time, e.g., changing lighting, crowd densities, and changing object mixes. It can be difficult to cover all these variations during training, especially since even subtle variations can affect accuracy. As a result, and as described in more detail below, there can be a sizable drop in the accuracy of edge DNNs due to data drift. Further, the use of compressed DNNs having fewer weights and shallower architectures than uncompressed DNNs may not provide suitably high accuracy when trained with large variations in the data.

Continuous learning is one approach to addressing data drift. Using continuous learning, edge DNNs are incrementally retrained on new video samples even as some knowledge from before is retained. Continuous learning techniques retrain the DNNs periodically, and while continuing to make inferences. The term "continuous retraining and operation" also is used herein to refer to such continuous learning. A period between two retrainings is referred to herein as a "retraining window." In some examples, the retraining window may have a duration of 10 seconds-10 minutes, or can have any other suitable duration in other examples. In various examples described below, retraining windows of 120 and 200 seconds are used, as non-limiting examples. It will be appreciated that the methods and devices disclosed herein are independent of the duration of the retraining window.

A sample of data accumulated during each retraining window is used for retraining. Advantageously, such ongoing learning may help the compressed edge models maintain suitably high accuracy even with changing data characteristics. However, adding continuous training to edge servers presents a tradeoff between the live inference accuracy and drop in accuracy due to data drift. For example, allocating more resources to a retraining job allows it to finish faster and provide a more accurate model sooner. At the same time, during the retraining, taking away resources from an inference job may lower its accuracy (e.g., because it may have to sample the frames of the video to be analyzed).

Central to the resource demand and accuracy of the jobs are their configurations. For retraining jobs, configurations refer to the hyperparameters that impact resource demand and accuracies. The improvement in accuracy due to retraining also relates to how much the characteristics of the live videos have changed. For inference jobs, configurations like frame sampling and resolution impact the accuracy and resources used to keep up with analyzing the live video.

Implementing continuous retraining may involve making the following decisions: (1) in each retraining window, decide which edge models of a plurality of models to retrain; (2) allocate the edge server's GPU resources among the retraining and inference jobs, and (3) select the configurations of the retraining and inference jobs. Decisions may also be constrained such that the inference accuracy at any point in time does not drop below a minimum value (so that the outputs continue to remain useful to the application). As described below, an inference accuracy averaged over the retraining window (aggregating the accuracies during and after the retrainings) across all the videos analyzed on the edge server can be used as a training metric. Increasing inference accuracy over the retraining window provides a different approach over (i) video inference systems that optimize instantaneous accuracy, and (ii) model training systems that optimize eventual accuracy, and can provide better inference performance in an edge device context, as described in more detail below.

Addressing the fundamental tradeoff between a retrained model's accuracy and the inference accuracy of the model is computationally complex. First, the decision space is multi-dimensional, and comprises a diverse set of retraining and inference configurations, and choices of resource allocations over time. Second, it is difficult to know the performance of different configurations (in resource usage and accuracy, for example) without actually retraining using different configurations. Data drift may exacerbate these challenges because a decision that works well in a retraining window may not do so in the future.

Accordingly, examples are disclosed that relate allocating computing resources and selecting hyperparameter configurations during continuous retraining and operation of the machine learning model. Inference accuracy averaged over a retraining window can serve as a metric for evaluating retraining hyperparameter configurations. A micro-profiler estimates the benefits and costs of retraining edge machine learning models using various hyperparameter configurations, and selects a set of hyperparameter configurations for possible use in retraining. In addition, a scalable resource scheduler is used to allocate computing resources between joint retraining and inference jobs on edge servers by testing the hyperparameter configurations provided by the micro-profiler.

In each retraining window, the resource scheduler makes the decisions described above to (1) decide which of the edge models to retrain; (2) allocate the edge server's GPU resources among the retraining and inference jobs, and (3) select the configurations of the retraining and inference jobs.

In these decisions, the scheduler prioritizes retraining models of those video streams whose characteristics have changed the most, as these models may be most affected by data drift. The scheduler decides against retraining the models which do not improve a target metric. To prune the large decision space, the scheduler can use the following techniques. First, it can simplify the spatial complexity by considering GPU allocations in coarse fractions (e.g., 10%) that are accurate enough for the scheduling decisions, while also being mindful of the granularity achievable in modern GPUs. Second, it can avoid changing allocations to jobs during the re-training, which helps to avoid temporal complexity. Further, and as described in more detail below, the micro-profiler prunes the list of hyperparameter configurations to a subset of promising options.

To make efficient choices of configurations for retraining and making inferences, the resource scheduler utilizes estimates of accuracy after the retraining and resource demands. The micro-profiler observes the accuracy of the retraining configurations on a relatively small subset of the training data in the retraining window with a small number of epochs (e.g., 5 epochs), rather than a full set of training data for the retraining window. It uses these observations to extrapolate estimated accuracies that may be achieved when retrained on a larger dataset for more epochs. Further, the micro-profiling may be applied to a small set of promising retraining configurations, instead of all possible configurations. Together, these techniques result in the micro-profiler being observed to be nearly 100× more efficient than exhaustive profiling, while estimating inference accuracies with an error of 5.8%. To estimate the resource demands, the micro-profiler measures the retraining duration per epoch when 100% of the GPU is allocated, and scales out the training time for different allocations, numbers of epochs, and training data sizes.

As described in more detail below, example continuous retraining and operation implementations according to the present disclosure were evaluated using a system deployment and trace-driven simulation. Video workloads were used from dashboard cameras of smart cars as well as from statically mounted traffic and building cameras over 24-hour durations. The observed accuracy was 29% higher than competing baselines. As a measure of efficiency, the baseline would use 4× more GPU resources to achieve the same level of accuracy.

FIG. 1 shows one example of an edge device deployment for video analytics. A plurality of cameras 104 are communicatively coupled to an edge computing device 108 via a local network 112. In the example of FIG. 1, the edge computing device 108 takes the form of an edge server computing device and the local network 112 takes the form of a wireless local area network (LAN) (e.g., a Wi-Fi network). It will also be appreciated that edge computing device 108 and the local network 112 may take any other suitable configuration. The edge computing device 108 may be equipped with consumer-grade GPUs 116, and executes DNN retraining and inference containers 120. In other examples, the edge computing device 108 may have any other suitable configuration.

As introduced above, video analytics deployments may analyze videos on edge servers placed on premise. Due to cost and energy constraints, compute efficiency can be a primary design goals of edge computing. An edge server may support tens of video streams, e.g., on the cameras 104 in a building, with customized analytics and models for each stream.

Video analytics applications may adopt edge computing as opposed to cloud-based computing to address issues such as limited network bandwidth to the cloud, unreliability of the network to the cloud, and privacy of the video content. Edge deployments may be in locations where an uplink network to the cloud is expensive for shipping continuous video streams, e.g., in oil rigs with an expensive satellite network or smart cars with a data-limited cellular network, as examples. Also, network links out of the edge locations can experience outages. Edge compute thus provides robustness against disconnection to the cloud and prevent disruptions. Further, videos may contain sensitive and private data that users do not want sent to the cloud (e.g., some jurisdictions may legally mandate that traffic videos be processed locally). Thus, it can be beneficial to run both inference and retraining on the edge compute device itself, without relying on the cloud. In addition, with low bandwidths that can be found in some edge deployments, cloud-based solutions may be slower and result in lower accuracies.

Advances in computer vision research have led to DNN models that achieve high accuracy with a large number of weights, deep architectures, and copious training data. While highly accurate, using these heavy and general DNNs for video analytics can be expensive and slow, which can make them unfit for resource-constrained edge computing. Accordingly, specialized and compressed DNNs may be trained and deployed to address these resource constraints on the edge. The compressed DNNs comprise fewer weights and shallower architectures than uncompressed DNNs and are trained to recognize objects and scenes specific to each video stream. To maintain high accuracy, the compressed DNNs may forego generality for improved compute efficiency.

As specialized edge DNNs may have fewer weights and shallower architectures than general DNNs, they may memorize fewer object appearances, object classes, and scenes. As a result, specialized edge DNNs may be more vulnerable to data drift, where live video data diverges significantly from the initial training data. For example, variations in the angles of objects, scene density (e.g., rush hours), and lighting (e.g., sunny vs. rainy days) over time make it difficult for traffic cameras to accurately identify objects of interest (e.g., cars, bicycles, road signs). Cameras in modern cars observe vastly varying scenes (e.g., building colors, crowd sizes) as they move through different neighborhoods and cities. Further, the distribution of the objects may change over time, which in turn, can reduce the edge model's accuracy. Owing to their ability to memorize fewer object variations, to maintain a target accuracy, edge DNNs may be continuously updated to account for more recent data and changing object distributions. The high temporal locality of videos allows the edge DNNs to focus their learning on the most recent object appearances and object classes. For example, a modified version of iCaRL (S. Rebuffi, A. Kolesnikov, G. Sperl, C. H. Lampert. "icarl: Incremental classifier and representa-tion learning", CVPR, 2017) may be used.

The example learning algorithms disclosed herein onboard new classes, as well as adapt to the changing characteristics of existing classes. Since manual labeling may not be feasible for continuous training systems on the edge, labels are obtained using a "golden model," which refers to a machine learning model (e.g. a DNN) that is highly accurate but more computationally expensive due to using a deeper architecture with large number of weights compared to a compressed model. The golden model may not keep up with inference on the live videos, but may be used to label a small fraction of the videos in the retraining window that are used for retraining. In this manner, a low-cost "student" model (a compressed DNN) may be supervised with a high cost "teacher" model (the "golden model" DNN), which may be referred to as knowledge distillation. A golden model also is referred to herein as a "more comprehensive" machine learning model.

The benefits of continuous learning can be seen using a video stream from one example city in the Cityscapes dataset (M. Cordts, M. Omran, S. Ramos, T. Rehfeld, M. Enzweiler, R. Benenson, U. Franke, S. Roth, B. Schiele, "The cityscapes dataset for semantic urban scene understanding", CVPR, 2016) comprising videos from dashboard cameras in many cities. Both moving dashboard cameras as well as static cameras were used over long time periods to obtain this video data. The video data in the example city was divided into ten fixed re-training windows, each of which is 200 seconds in this example).

Figure 2A:
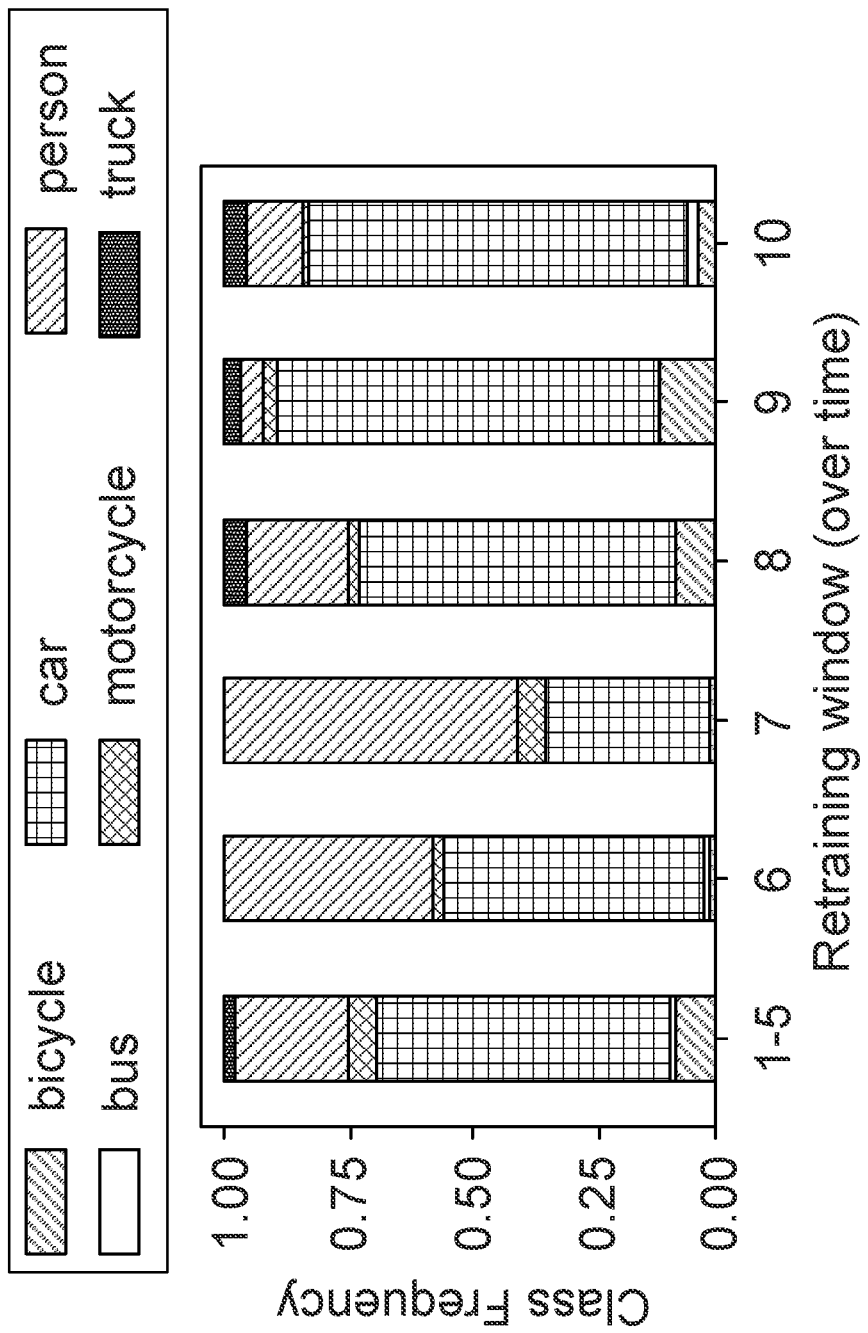
FIG. 2A shows an example of how objects in different classes are observed at different frequencies over time in a sample video data set.
Figure 2B:
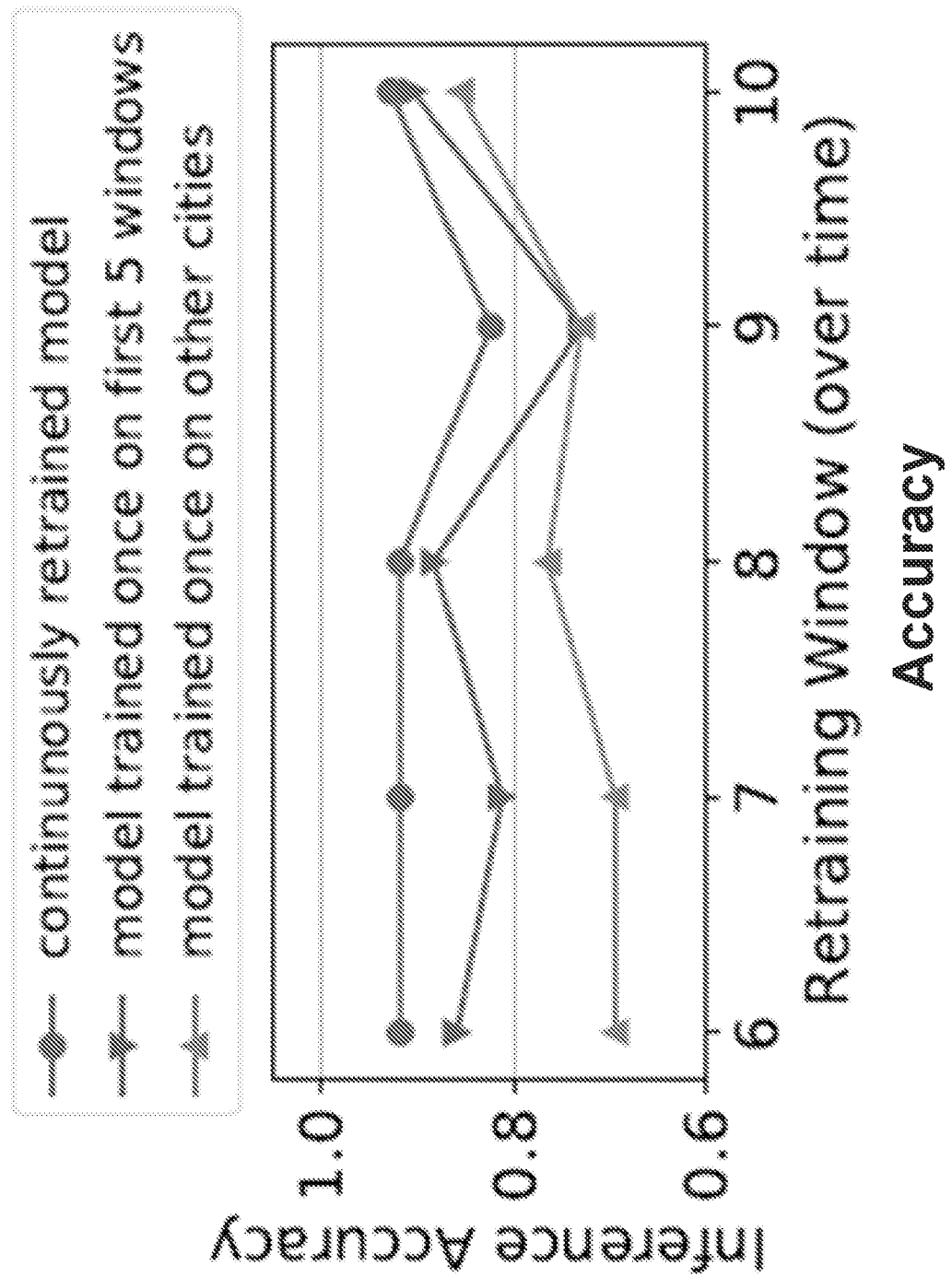
FIG. 2B shows a graph depicting a comparison of an inference accuracy of a continuously retrained model compared to other retraining methods using the retraining windows of FIG. 2A.
Figure 2C:
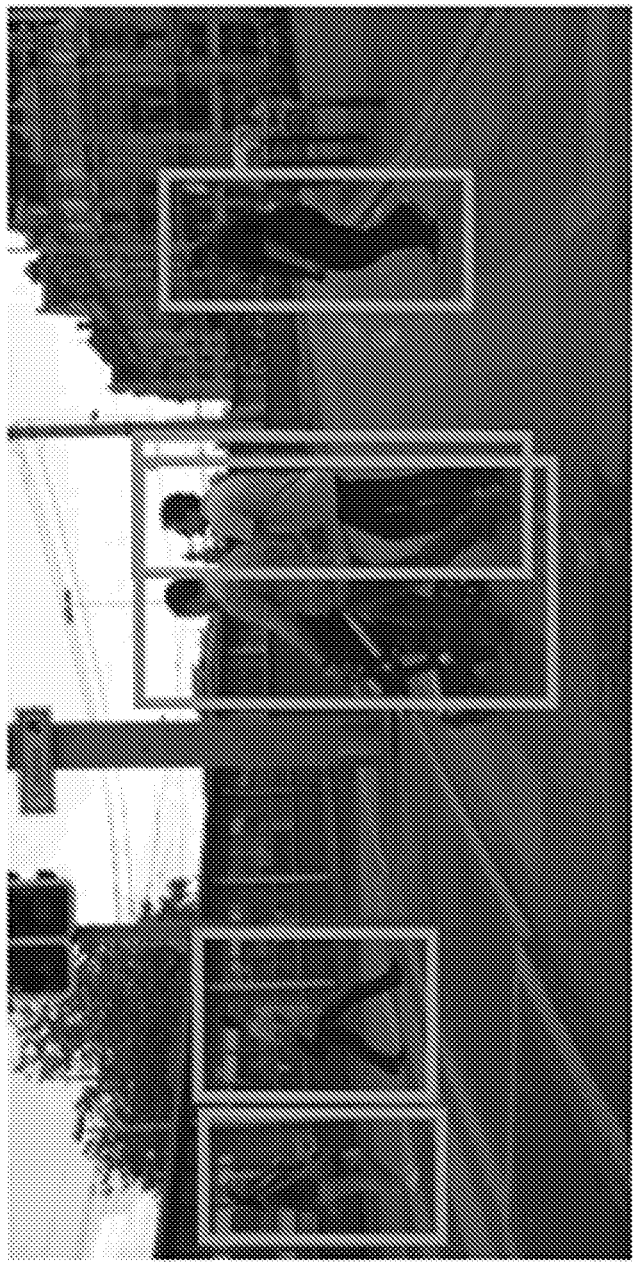

FIG. 2A shows how distributions of object classes changed among different windows. The initial five windows included a fair amount of persons and bicycles, but bicycles were rarely shown in windows 6 and 7, while the share of persons varied considerably across windows 6-10. As shown in FIG. 2B, this shift in class distributions may be addressed by continuous learning. As shown in FIGS. 2C and 2D, even persons had different appearances (e.g., clothing and angles) over time, which can also influence inference accuracy.

FIG. 2B shows a plot of inference accuracy of an edge DNN (a compressed ResNet18 classifier) in the last five windows using different training options. As shown, training a compressed ResNet18 with video data on all other cities of the Cityscapes dataset did not result in as good of performance compared to other options. Training the edge DNN once using data from the first five windows of this example city improved the accuracy, while continuous retraining using the most recent data for training achieved the highest accuracy consistently of the options tested. The accuracy for continuous retraining was higher than the other options by up to 22%.

Using the data from the first five windows to train a larger ResNet101 DNN (not graphed) achieved better accuracy that nearly matched the continuously retrained ResNet18. The substantially better accuracy of ResNet101 compared to ResNet18 when trained on the same data of the first five windows also showed that this training data was fairly representative. The lightweight ResNet18's weights and architecture reduced its ability to learn, contributing to its lower accuracy. Nonetheless, ResNet101 was 13× slower than the compressed ResNet18. This makes the efficient ResNet18 more suited for edge deployments, and continuous learning enables it to maintain high accuracy even with data drift. Hence, continuous training of edge DNNs may be desirably conducted as an ongoing process, rather than during an initial "ramp-up" phase.

As described in more detail below, retraining and inference are performed jointly on edge computing devices. This joint approach may utilize resources more effectively than statically provisioning compute resources for retraining on edge servers. Since continuous retraining is periodic and may demand more computing resources than inference, static provisioning may result in idling and wastage. Compared to uploading videos to the cloud for retraining, this approach has clear advantages for privacy as well as network costs and accuracy.

Figure 3A:
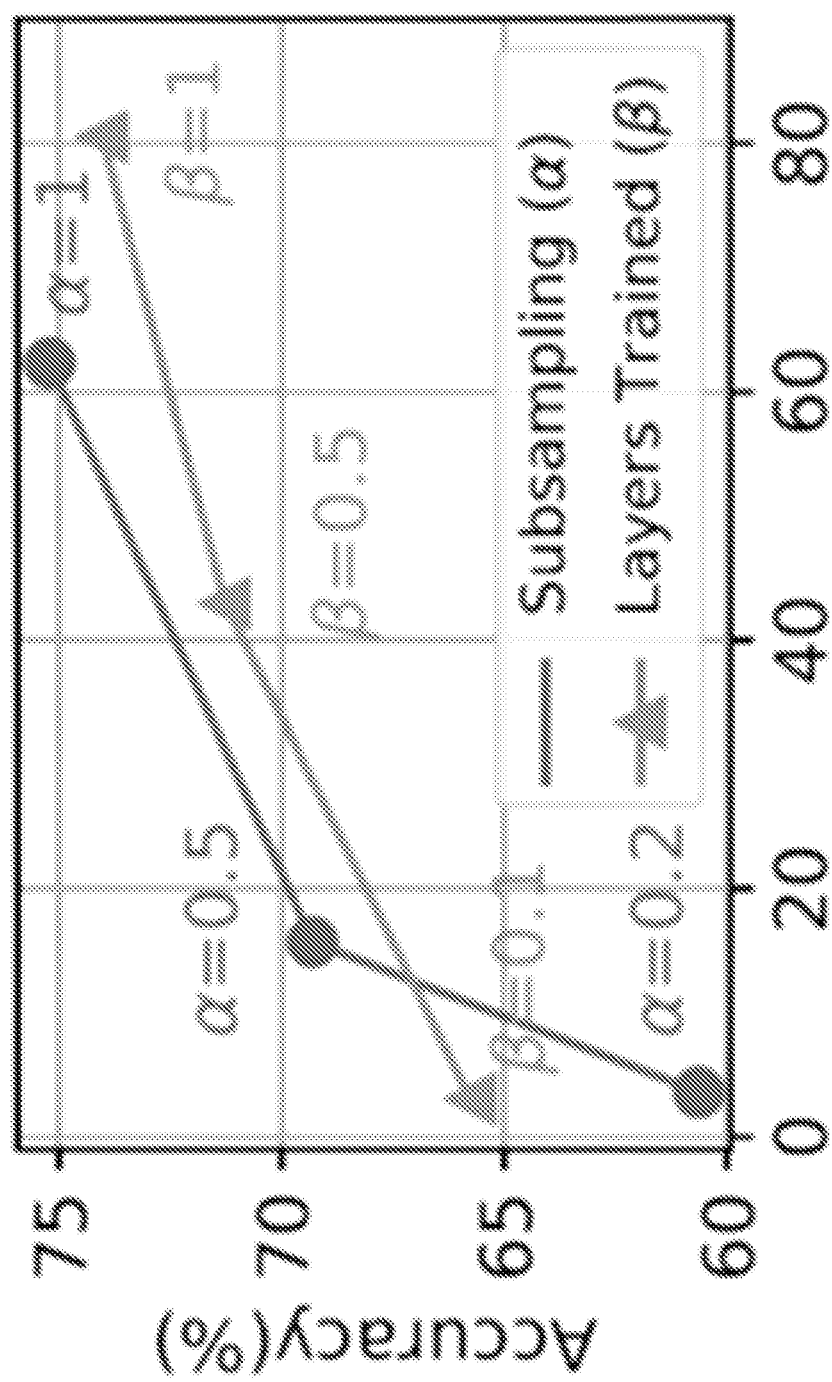
FIG. 3A shows a graph illustrating inference accuracy as a function of hyperparameter configurations used for retraining.
Figure 3B:
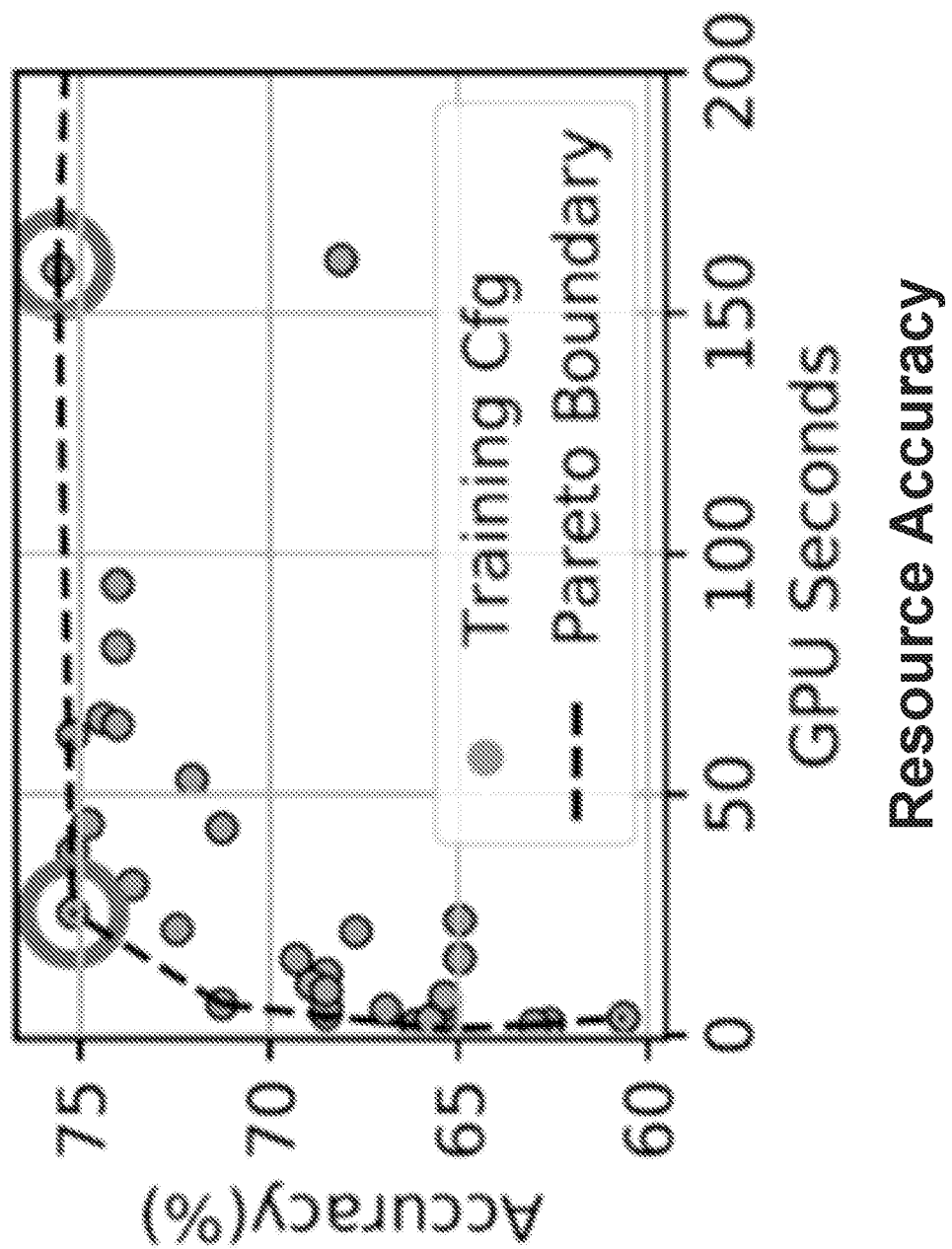
FIG. 3B shows a graph illustrating inference accuracy as a function of graphics processing unit (GPU) resources and shows a pareto curve of a resource-accuracy profile.

Configurations of hyperparameters chosen for retraining influence resource demands and accuracy. Retraining fewer layers of the DNN (or, "freezing" more layers) consumes lesser GPU resources, as does training on fewer data samples, but they also produce a model with lower accuracy. FIGS. 3A and 3B show measurements of retraining configurations using the Cityscapes dataset. GPU seconds refers to the duration taken for retraining with 100% GPU allocation. In the example of FIG. 3A, two example hyperparameters were varied (subsampling and layers trained), keeping others constant.

FIG. 3B illustrates resource-accuracy trade-offs for an edge DNN (e.g., ResNet18) with various hyperparameters: number of training epochs, batch sizes, number of neurons in the last layer, number of frozen layers, and fraction of training data. As can be seen, there was a wide spread in resource usage (measured in GPU seconds), by up to a factor of 200×. Second, higher resource usage may not yield higher accuracy. For the two configurations circled in FIG. 3B, their GPU demands varied by 6× even though their accuracies were the same (~76%). Thus, careful selection of the configurations considerably impacts the resource efficiency. However, with the characteristics of the videos changing over time, it can be challenging to efficiently obtain resource-accuracy profiles for retraining configurations. FIG. 3B also shows a Pareto boundary of the configurations. As illustrated by example in FIG. 3B, for each non-Pareto configuration, there is at least one Pareto configuration that is better in both accuracy and GPU cost.

Inference pipelines may also allow for flexibility in their resource demands at the cost of accuracy through configurations to downsize and sample frames. Profilers can efficiently obtain resource-accuracy relationships for inference configurations. Such profilers may be used for joint retraining and inference, and also to ensure that the inference pipelines continue to keep up with analyzing the live video streams with their currently allocated resources.

The following paragraphs provide an illustrative example of scheduling inference and retraining tasks jointly with 3 GPUs and two video streams, A and B. Each retraining uses data samples accumulated since the beginning of the last retraining (referred to as the "retraining window"). As described in more detail below, a scheduler obtains knowledge of resource-accuracy profiles from a profiler. Table 1 shows an example of four retraining configurations (Cfg1A, Cfg2A, Cgf1B, and Cgf2B), their respective accuracies after retraining, and their GPU cost.

TABLE 1

Hyperparameter configurations for example retraining jobs. At the start of retraining window 1, camera A's inference model had an accuracy of 65% and camera B's inference model had an accuracy of 50%. Asterisk (*) denotes the configurations picked in FIGS. 4B and 4D.

| Configuration | Retraining Window 1 | | Retraining Window 2 | |
| --- | --- | --- | --- | --- |
| | End Accuracy | GPU seconds | End Accuracy | GPU seconds |
| Video A Cfg1A | 75 | 85 | 95 | 90 |
| Video A Cfg2A (*) | 70 | 65 | 90 | 40 |
| Video B Cfg1B | 90 | 80 | 98 | 80 |
| Video B Cfg2B (*) | 85 | 50 | 90 | 70 |

The scheduler is configured to select configurations and allocate resources for inference and retraining jobs. A baseline solution for resource allocation evenly splits the GPUs between video streams, and each stream evenly partitions its allocated GPUs for retraining and inference tasks. The baseline picks the configuration for retraining that results in the highest accuracy. (Cfg1A, Cfg1B for both windows).

Figure 4A:
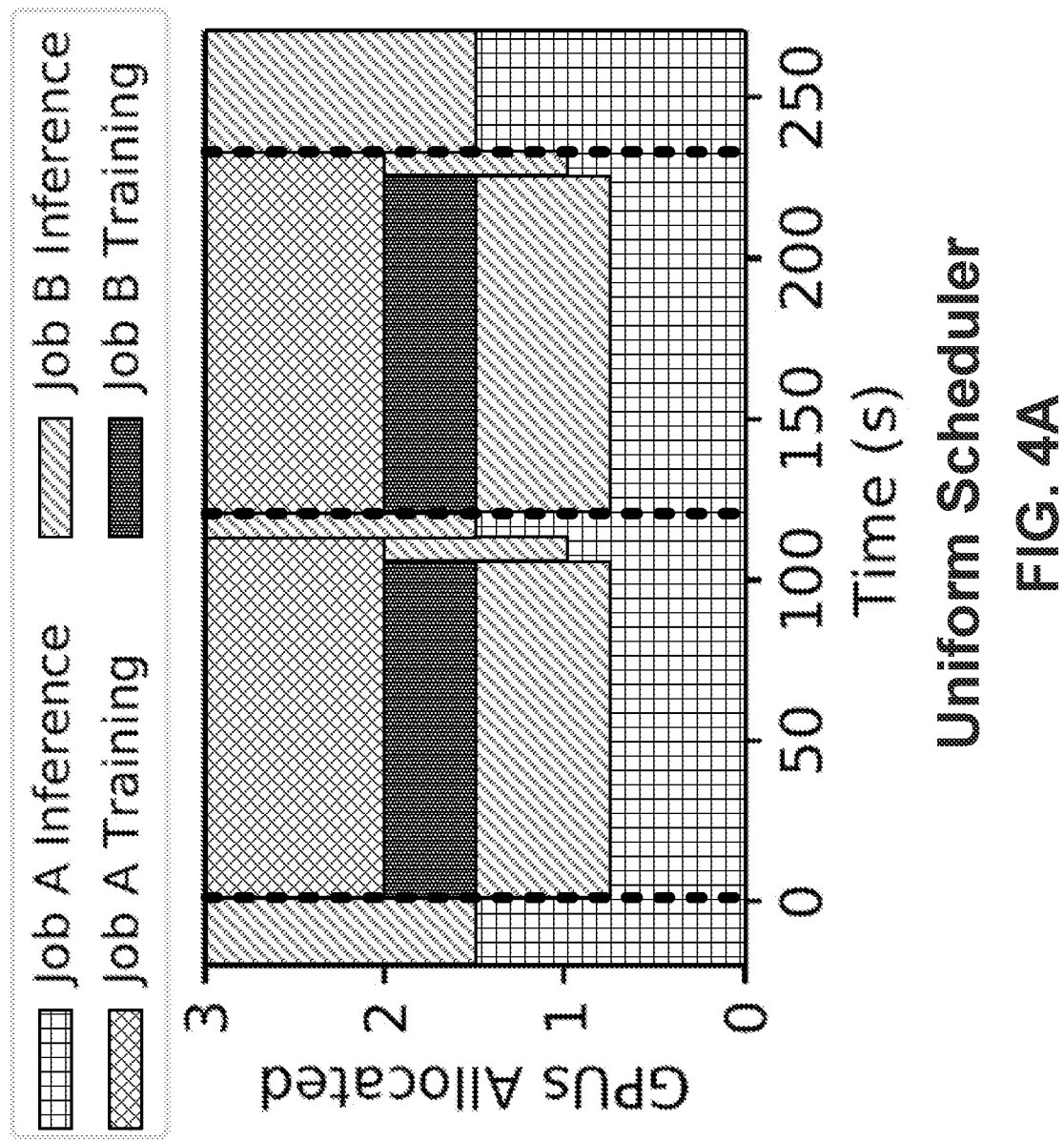
FIG. 4A shows a plot of resource allocations over time for two retraining windows using a baseline scheduler.
Figure 4B:
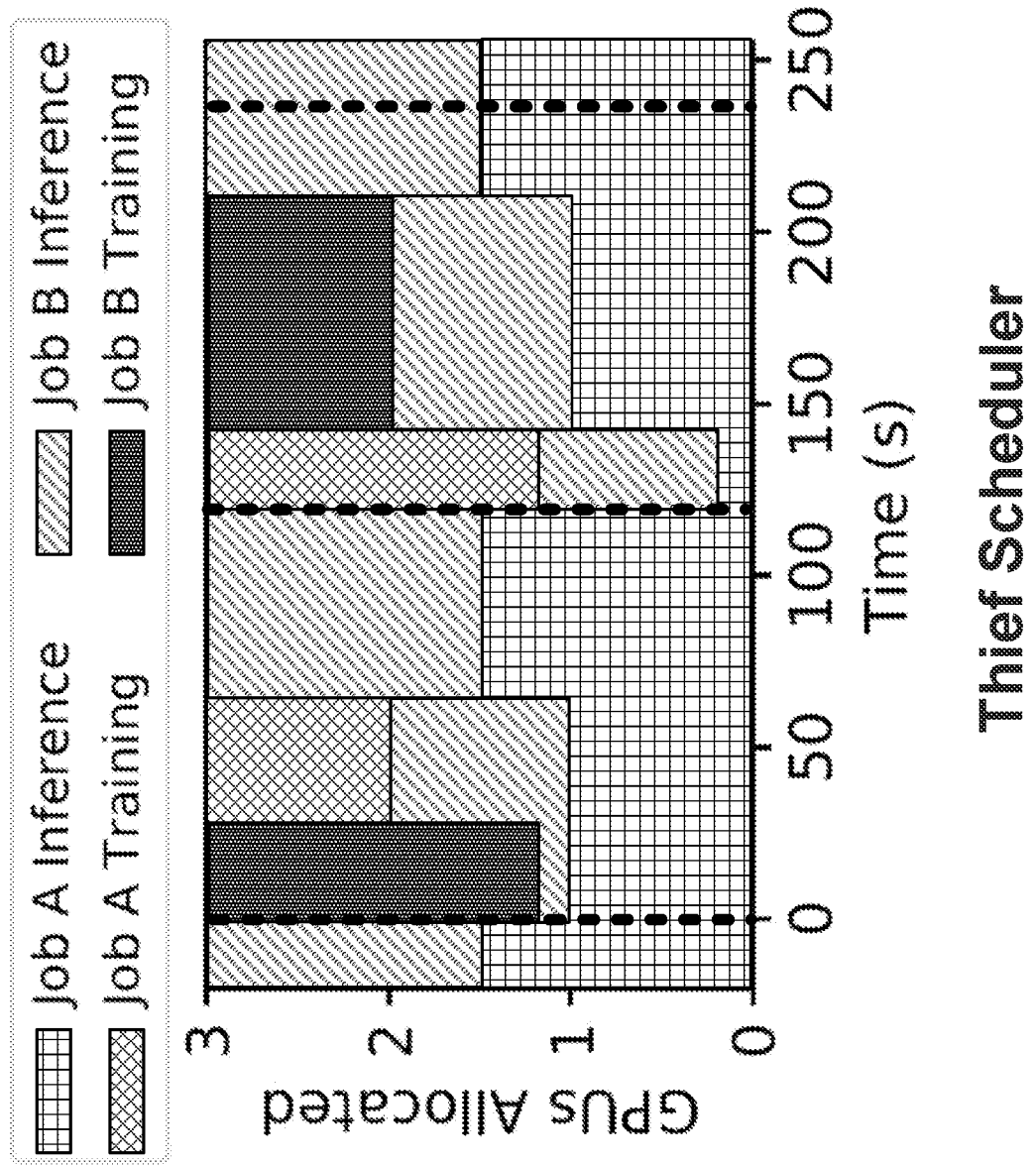
FIG. 4B shows a plot of resource allocations over time for two retraining windows using a thief scheduler.
Figure 4C:
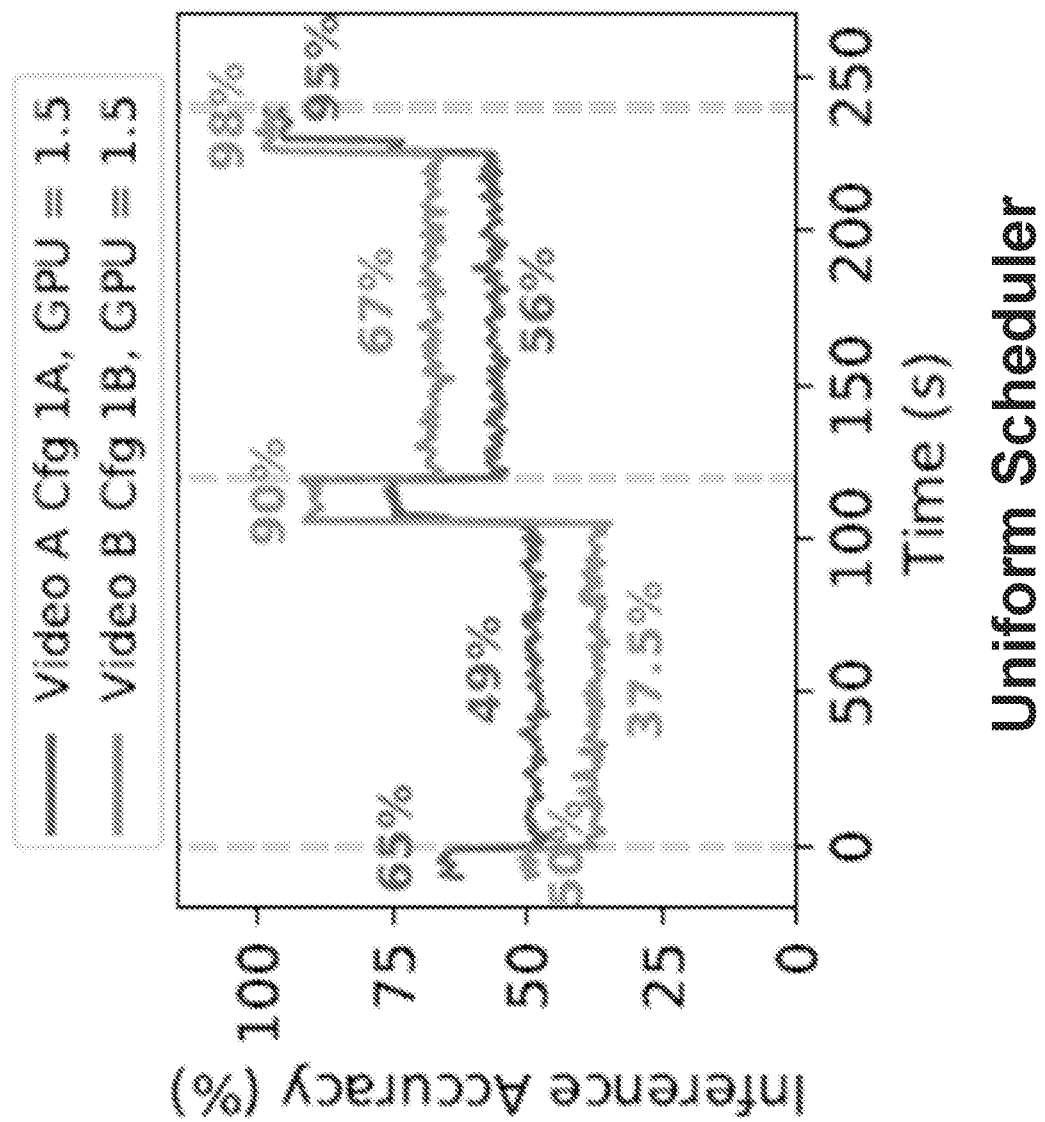
FIG. 4C shows a plot of inference accuracies for the two retraining windows of FIG. 4A using the baseline scheduler.
Figure 4D:
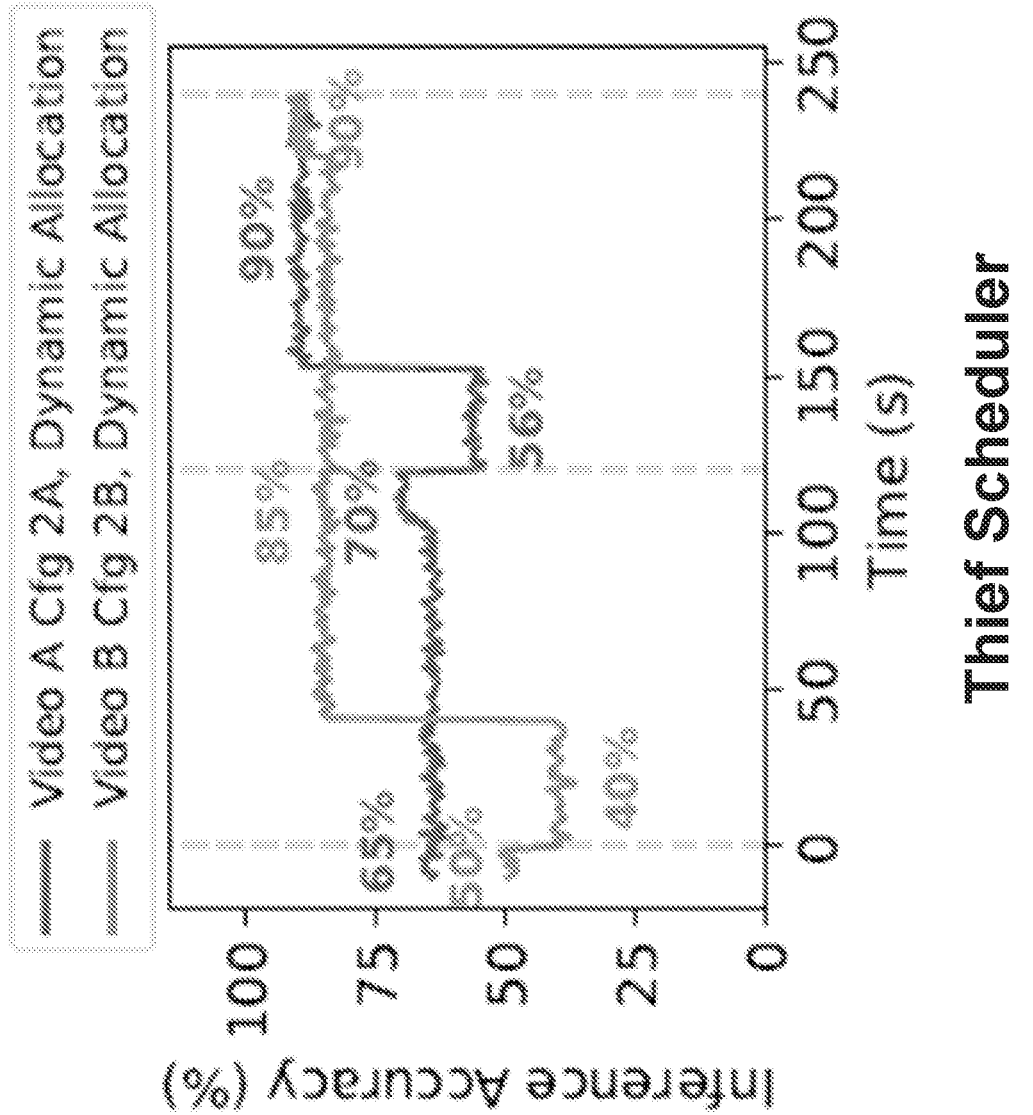
FIG. 4D shows a plot of inference accuracies for the two retraining windows of FIG. 4B using the thief scheduler.

FIGS. 4A and 4B show plots of resource allocations over time for two retraining windows (each of 120 s). FIGS. 4C and 4D show plots of inference accuracies for the two retraining windows. FIGS. 4A and 4C show the results of using the baseline scheduler which evenly splits the 3 GPUs, and picks configurations resulting in the most accurate models (e.g. Cfg1A and Cfg1B above). FIGS. 4B and 4D show the results of using a so-called thief scheduler that prioritizes resources and optimizes for inference accuracy averaged over the retraining window (73% compared to the uniform scheduler's 56%). The thief scheduler also ensures that inference accuracy does not drop below a minimum (set to 40% in this example, denoted as αMIN). An example thief scheduler is described in more detail below.

Referring to FIG. 4C, when the retraining tasks take resources away from the inference tasks, the inference accuracy dropped significantly (from 65%→49% for video A and 50%→37.5% for video B in the first retraining window). While the inference accuracy increased significantly after retraining, it leaves too little time in the window to reap the benefit of retraining. Averaged across both retraining windows, the inference accuracy across the two video streams was 56% because the gains due to the improved accuracy of the retrained model were undercut by the time taken for retraining (during which inference accuracy suffered). FIGS. 4B and 4D show the results of using a thief scheduling approach, described in more detail below, which by taking a holistic view on the multi-dimensional tradeoffs, provided an average inference accuracy of 73%. To match the accuracies, the uniform scheduler would use nearly twice the GPUs (i.e., 6 GPUs instead of 3 GPUs). The thief scheduling approach may also be applied to other optimization metrics, such as max-min of accuracy.

Thus, the scheduler selects hyperparameter configurations based on their accuracy improvements relative to their GPU cost averaged across a retraining window. The scheduler may select lower accuracy options (e.g., Cfg2A/Cfg2B) instead of higher accuracy ones (e.g., Cfg1A/Cfg1B) because these configurations are substantially cheaper (see, e.g., Table 1), and may result in a higher average inference accuracy across a retraining window, even if an ultimate accuracy is lower than a different configuration. Second, the scheduler may prioritize retraining tasks that yield higher accuracy improvement, so there is more time to reap the higher benefit from retraining. For example, the scheduler prioritized video B's retraining in the second retraining window of FIGS. 4A-4D as its inference accuracy after retraining increases by 35% (compared to 5% for video A). Third, the scheduler may control accuracy drops during retraining by balancing retraining time and resources taken away from inference tasks.

As mentioned above, to perform continuous training, edge computing devices may smartly decide when to retrain each video stream's model, how much resources to allocate, and what configurations to use. However, it can be challenging to make these decisions.

First, the decision space of multi-dimensional configurations and resource allocations is complex. In some examples, this problem is computationally more complex than two individually challenging problems of a multi-dimensional knap-sack and a multi-armed bandit. Accordingly, a thief resource scheduler, such as the example scheduler disclosed in more detail below, can be used render joint retraining-inference scheduling tractable in practice.

Second, decision making utilizes knowledge of a model's specific performance (in resource usage and inference accuracy), but it is difficult retrain the model using all possible configurations. As such, this challenge may be addressed by designing a micro-profiling-based estimator, which profiles a subset of promising configurations on a tiny fraction of the training data with early termination, as mentioned above. These techniques may reduce the cost of decision making and performance estimation.

Figure 5:
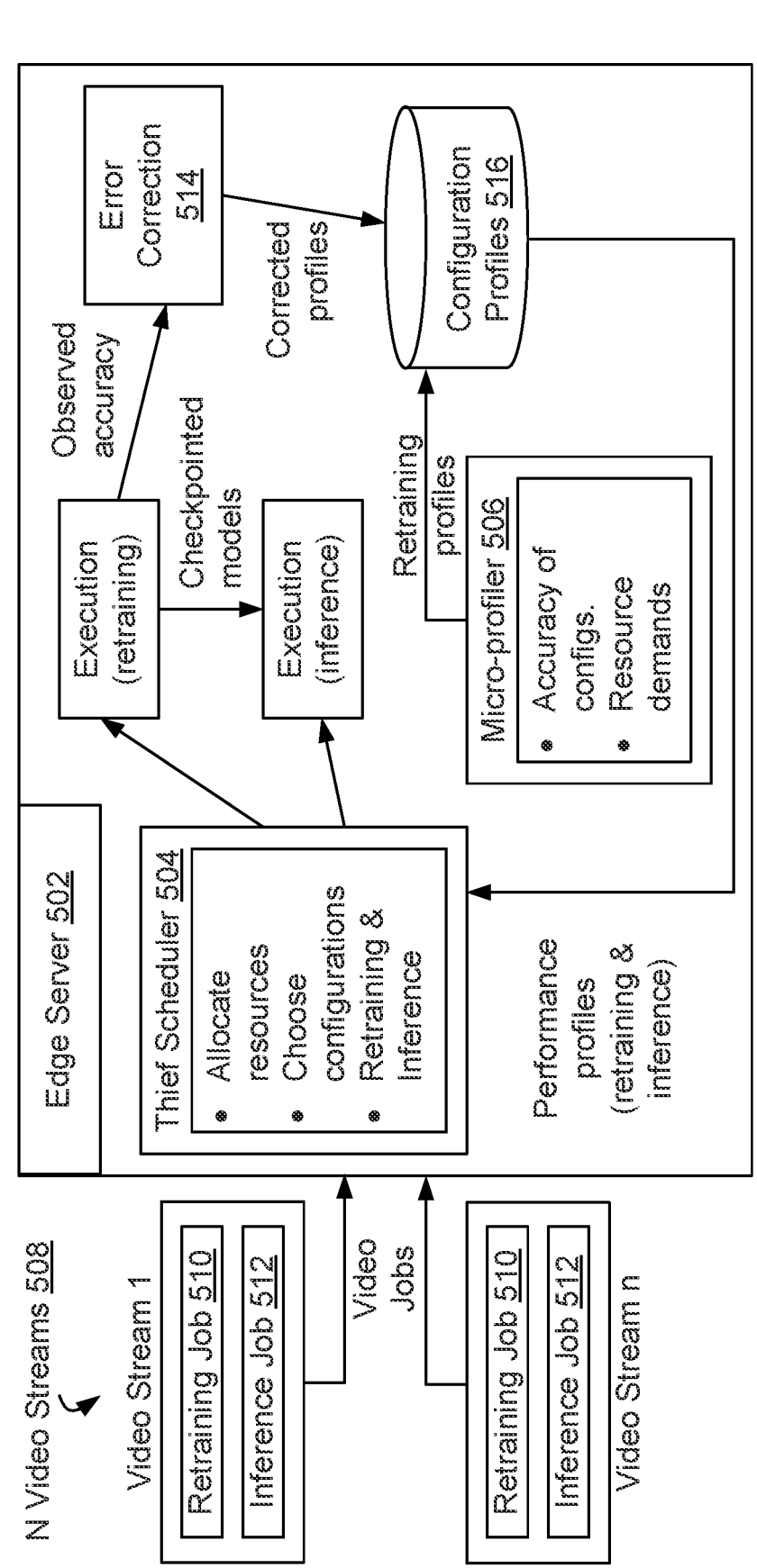
FIG. 5 shows a block diagram of an example system for allocating resources and profiling possible hyperparameter configurations.

FIG. 5 shows a block diagram of an example system 500 for allocating resources and profiling possible hyperparameter configurations. System 500 comprises an edge server 502 on which a thief scheduler 504 and a micro-profiler 506 are executed by one or more processors and/or other logic components (e.g. GPUs, field programmable gate arrays (FPGSAs), etc.) via instructions stored on the edge server 502. Example computer hardware is described in more detail below with reference to FIG. 15. The thief scheduler 504 is configured to allocate compute resources, and to choose hyperparameter configurations for retraining and inference jobs performed for each video stream of n video streams 508. The edge server 502 executes the retraining jobs 510 and the inference jobs 512 based upon scheduling determined by the thief scheduler 504, and observes inference accuracies from retraining. The observed accuracies are compared to extrapolated inference accuracies that were previously determined by the micro-profiler, and error correction 514 is performed where appropriate. The retraining jobs can periodically checkpoint the inference jobs to help to provide additional accuracy for the inference jobs.

The micro-profiler 506 chooses a set of retraining profiles for the thief scheduler 504 by testing a superset of hyperparameter configurations for inference and retraining using on a relatively low number of training epochs. Observed inference accuracy improvements are extrapolated for each hyperparameter configuration that is tested, and the set of hyperparameter configurations that provide greater extrapolated improvements in inference accuracy are stored as configuration profiles 516 for the thief scheduler to utilize.

A goal of joint inference and retraining as disclosed is to maximize overall inference accuracy for all videos streams V averaged over a given retraining window T (a duration of each retraining window is represented herein by $\|T\|$.) Inference and retraining is performed on $\mathcal{G}$ GPUs. Thus, the total compute capability is $\mathcal{G}\|T\|$ GPU-time. Without loss of generality, $\delta$ represents the smallest granularity of GPU allocation. Table 2 lists the notations used herein. As described in more detail below, each video v∈V has a set of retraining configurations Γ and a set of inference configurations Λ.

For each video v∈V in a window T, the example algorithm decides (1) the retraining configuration γ∈Γ (γ=∅ means no retraining); (2) the inference configuration λ∈Λ; and (3) how many GPUs (in multiples of $\delta$) to allocate for retraining ($\mathcal{R}$) and inference ($\mathcal{I}$). Binary variables $\phi_{v\gamma\lambda\mathcal{R}\mathcal{I}} \in \{0, 1\}$ are used to denote these decisions. These decisions utilize $C_T(v, \gamma, \lambda)$ GPU-time and yield overall accuracy $A_T(v, \gamma, \lambda, \mathcal{R}, \mathcal{I})$. As introduced above, $A_T(v, \gamma, \lambda, \mathcal{R}, \mathcal{I})$ is averaged across the window T, and the inference accuracy at each point in time is determined by the above decisions.

TABLE 2

Notation and descriptions.

| Notation | Description |
| --- | --- |
| V | Set of video streams |
| v | A video stream (v ∈ V) |
| T | A retraining window with duration $\|T\|$ |
| Γ | Set of all retraining configurations |
| Λ | A retraining configuration (γ ∈ Γ) |
| Λ | Set of all inference configurations |
| γ | An inference configuration (λ ∈ Λ) |
| $\mathcal{G}$ | Total number of GPUs |
| $\delta$ | The unit for GPU resource allocation |
| $A_T(v, \gamma, \lambda, \mathcal{R}, \mathcal{I})$ | Inference accuracy for video v for given configurations and allocations |
| $C_T(v, \gamma, \lambda)$ | Compute cost in GPU-time for video v for given configurations and allocations |
| $\phi_{v\gamma\lambda\mathcal{R}\mathcal{I}}$ | A set of binary variables ($\phi_{v\gamma\lambda\mathcal{R}\mathcal{I}} \in \{0, 1\}$). $\phi_{v\gamma\lambda\mathcal{R}\mathcal{I}} =$ 1 iff using retraining config γ, inference config λ, $\mathcal{R}\delta$ GPUs for retraining, $\mathcal{I}\delta$ GPUs for inference for video v. |

In some examples, the optimization algorithm aims to maximize inference accuracy averaged across all videos in a retraining window within a GPU's resource limit, as shown in equation 1.

$$\underset{\phi_{v\gamma\lambda\mathcal{R}\mathcal{I}}}{\arg\max} \frac{1}{\|V\|} \Sigma_{v \in V, v \gamma \in \Gamma, v \lambda \in \Lambda, v\mathcal{R}, v\mathcal{I} \in [0...\frac{\mathcal{G}}{\delta}]} \phi_{v\gamma\lambda\mathcal{R}\mathcal{I}} \cdot A_T(v, \gamma, \lambda, \mathcal{R}, \mathcal{I}) \quad (1)$$

Equation 1 may be subject to the following conditions, shown in equations 2-4.

$$\Sigma_{v \in V, v \gamma \in \Gamma, v\lambda \in \Lambda, v\mathcal{R}, v\mathcal{I}}\ \phi_{v\gamma\lambda\mathcal{R}\mathcal{I}} \cdot C_T(v, \gamma, \lambda) \leq \mathcal{G}\|T\| \quad (2)$$

$$\Sigma_{v \in V, v \gamma \in \Gamma, v\lambda \in \Lambda, v\mathcal{R}, v\mathcal{I}}\ \phi_{v\gamma\lambda\mathcal{R}\mathcal{I}} \cdot (\mathcal{R} + \mathcal{I}) \leq \frac{\mathcal{G}}{\delta} \quad (3)$$

$$\Sigma_{v \gamma \in \Gamma, v\lambda \subset \Lambda, v\mathcal{R}, v\mathcal{I}}\ \phi_{v\gamma\lambda\mathcal{R}\mathcal{I}} \leq 1, \forall v \in V \quad (4)$$

The first constraint (expression (2)) keeps the GPU allocation within the GPU-time $\mathcal{G}\|T\|$ available in the retraining window. The second constraint (expression (3)) keeps the GPU allocation (in multiples of $\delta$) within a total number of available GPUs at any point in time. According to the third constraint (expression (4)), at most one retraining configuration and one inference configuration are picked for each video v.

Assuming all $A_T(v, \gamma, \lambda, \mathcal{R}, \mathcal{I})$ values are known, equation 1 can be reduced to a multi-dimensional binary knapsack problem, a NP-hard problem. Specifically, binary options $\phi_{v\gamma\lambda\mathcal{R}\mathcal{I}}$ may be picked to maximize overall accuracy while satisfying two capacity constraints (e.g., expressions (2) and (3)). In practice, however, it may be challenging to obtain all $A_T(v, \gamma, \lambda, \mathcal{R}, \mathcal{I})$ values, as it can be challenging to train the edge DNN using all retraining configurations and running inference using all the retrained DNNs with all possible GPU allocations and inference configurations.

The uncertainty of $A_T(v, \gamma, \lambda, \mathcal{R}, \mathcal{I})$ resembles a multi-armed bandits (MAB) problem to maximize expected rewards given a set number of trials for a set of options.

However, this problem may be more challenging than MAB for two reasons. First, unlike the MAB problem, the cost of trials can $C_T(v, \gamma, \lambda)$ vary significantly, and an optimal solution may choose cheaper yet less rewarding options to maximize overall accuracy. Second, getting the reward $A_T(v, \gamma, \lambda, \mathcal{R}, \mathcal{J})$ after each trial utilizes "ground truth" labels that are obtained using a large golden model, which can be difficult to implement at scale on resource-scarce edge computing devices.

Accordingly, and in one potential advantage of the present disclosure, a scheduling heuristic may make the scheduling problem tractable by decoupling resource allocation (e.g., $\mathcal{R}$ and $\mathcal{J}$) and configuration selection (e.g., $\gamma$ and $\lambda$) (Algorithm 1). This example scheduling heuristic is referred to herein as a "thief" scheduler and it iterates among all inference and retraining jobs as follows.

---

Algorithm 1: Thief Scheduler.

---

Data: Training ($\Gamma$) and inference ($\Lambda$) configurations
Result: GPU allocations $\mathcal{R}$ and $\mathcal{J}$, chosen configurations
($\gamma \in \Gamma, \lambda \in \Lambda$) $\forall v \in V$
(1)    all_jobs[ ] = Union of inference and training jobs of videos V;
     /* Initialize with fair allocation     */
(2)    best_alloc[ ] = fair_allocation(all_jobs);
(3)    best_configs[ ], best_accuracy_avg = PickConfigs(best_alloc);
     /* Thief resource stealing     */
(4)    for thief_job in all_jobs[ ] do
(5)       for victim_job in all_jobs[ ] do
(6)          if thief_job = = victim_job then
(7)             continue;
(8)          temp_alloc[ ] ← best_alloc[ ];
(9)          while true do
            /* $\Delta$ is the increment of stealing   */

---

Algorithm 1: Thief Scheduler.

---

(10)            temp_alloc[victim_job] −= $\Delta$;
(11)           temp_alloc[thief_job] += $\Delta$;
(12)           if temp_alloc[victim_job] < 0 then
(13)              break;
           /* Calculate accuracy over retraining window and pick configurations.   */
(14)           temp_configs[ ], accuracy_avg = PickConfigs(temp_alloc[ ]);
(15)           if accuracy_avg > best_accuracy_avg then
(16)              best_alloc[ ] = temp_alloc;
(17)              best_accuracy_avg = accuracy_avg;
(18)              best_configs[ ] = temp_configs[ ];
(19)           else
(20)              break;
(21)    return best_alloc[ ], best_configs[ ];

---

(1) The thief scheduler is initialized with a "fair" allocation (e.g. an equal allocation of resources) for all video streams $v \in V$ (line 2 in Algorithm 1). In each step, it iterates over all the inference and retraining jobs of each video stream (lines 5-6), and "steals" a quantum $\Delta$ of resources (in multiples of $\delta$; see Table 2) from each of the other jobs (lines 10-11).

(2) With the new resource allocations (temp_alloc[ ]), the thief scheduler then selects configurations for the jobs using the PickConfigs method (line 14 and Algorithm 2, below) that iterates over all the configurations for inference and retraining for each video stream. For inference jobs, among all the configurations whose accuracy is $\geq \alpha_{MIN}$, PickConfigs picks the configuration with the highest accuracy that can keep up with the inference of the live video stream within the current allocation (line 3-4 in Algorithm 2, below).

---

Algorithm 2: PickConfigs.

---

Data: Resource allocations in temp_alloc[ ], configurations ($\Gamma$ and $\Lambda$), retraining window T, videos V.
Result: Chosen configurations $\forall v \in V$, average accuracy over T
(1)    chosen_accuracies[ ] ←{ }; chosen_configs[ ] ←{ };
(2)    for v in V[ ] do
(3)       infer_config_pool[ ] = $\Lambda$.where(resource_cost < temp_alloc[v.inference_job] && accuracy $\geq \alpha_{MIN}$);
(4)       infer_config = max(infer_config_pool, key=accuracy);
(5)       best_accuracy = 0;
(6)       for train_config in $\Gamma$ do
          /* Estimate accuracy of inference/training config pair over retraining window */
(7)          accuracy = EstimateAccuracy (train_config, infer_config, temp_alloc[v.training_job], T );
(8)          if accuracy > best_accuracy then
(9)             best_accuracy = accuracy;
(10)            best_train_config = train_config;
(11)      chosen_accuracies[v] = best_accuracy;
(12)      chosen_configs[v] = {infer_config, best_train_config};
(13)    return chosen_configs[ ], mean(chosen_accuracies[ ]);

For retraining jobs, PickConfigs picks the configuration that maximizes the accuracy $A_T(v, \gamma, \lambda, \mathcal{R}, \mathcal{J})$ over the retraining window for each video v (lines 6-12 in Algorithm 2, above). EstimateAccuracy in Algorithm 2 (line 7) aggregates the instantaneous accuracies over the retraining window for a given pair of inference configuration (chosen above) and retraining configuration. A micro-profiler (an example of which is described below) provides the estimate of the accuracy and the time to retrain for a retraining configuration when 100% of GPU is allocated, and EstimateAccuracy proportionately scales the GPU-time for the current allocation (in temp_alloc[ ]) and training data size. In doing so, it may avoid configurations whose retraining durations exceed $\|T\|$ with the current allocation (e.g., expression (2)).

(3) After reassigning the configurations, the thief scheduler uses the estimated average inference accuracy (accuracy_avg) over the retraining window (line 14 in Algorithm 1) and keeps the new allocations if a new allocation improves upon the accuracy from prior to stealing the resources (line 15 in Algorithm 1).

The thief scheduler repeats this process till the accuracy stops increasing (lines 15-20 in Algorithm 1) and until all the jobs have played the "thief". Algorithm 1 can be invoked at the beginning of each retraining window, as well as on the completion of each training job during the window to reallocate resources to the other training and inference jobs.

Coarse allocations, reallocating resources when a retraining job completes, and the use of a pruned configuration list can make the thief scheduler's decision more efficient. Regarding coarse allocations, the thief scheduler allocates GPU resources in quanta of $\Delta$. The quantum $\Delta$ may have any suitable value. For example, a value of $\Delta$ may be empirically chosen that is sufficiently coarse to provide for a desired efficiency, yet accurate enough for scheduling decisions, while also being mindful of the granularity achievable in modern GPUs. Sensitivity of $\Delta$ is described in more detail below with reference to FIGS. 8 and 9. Resource stealing may ensure that the total allocation is within the boundaries of expression (3) above.

Reallocating resources only when a retraining job is complete helps to avoid temporal complexity. Although one can reallocate GPU resource among jobs at finer temporal granularity (e.g., whenever a retraining job has reached a high accuracy), the empirical gains from such complexity may be marginal. However, a model may be periodically checkpointed so that an inference job can get the up-to-date accuracy from retraining.

Regarding pruning of a configuration list, a micro-profiler, described below, may speed up the thief scheduler by giving it a subset of more promising configurations selected from a superset of configurations (e.g. a full set), rather than a full set of all possible configurations. Thus, the list $\Gamma$ used in Algorithm 1 may be significantly smaller than the exhaustive set.

The thief scheduler's scheduling decisions described above use estimations of post-retraining accuracy and resource demand of the retraining configurations. In some examples, at the beginning of each retraining window T, the accuracy after retraining using $\gamma$ and the corresponding time taken to retrain is profiled for each video v and each configuration $\gamma \in \Gamma$. This profiling is different from hyperparameter tuning in at least two ways. First, the thief scheduler uses the performance estimates of a broad set of candidate configurations, rather than a single highest-accuracy configuration, because the highest-accuracy configuration is jointly decided across many retraining and inference jobs. Second, in contrast to hyperparameter tuning, which runs separately of the eventual inference/training, the profiling shares compute resource with the retraining and inference jobs.

Another possible way to select configurations may be to predict the performance of configurations based on their history from prior training instances. However, this can produce poor results in practice. In some examples, even when models from prior retraining windows with similar class distributions were cached and reused, the accuracy was still substantially lower due to other factors that are difficult to model like lighting, angle of objects, density of the scene, etc.

Thus, a micro-profiler can take an online approach by using the current retraining window's data. At least three empirical observations can be leveraged for efficient profiling of the retraining configurations. First, resource demands of the configurations are deterministic. Hence, the GPU-time taken to retrain for each epoch in the current retraining window may be measured when 100% of the GPU is allocated to the retraining. This may allow the time to be scaled for a varying number of epochs, GPU allocations, and training data sizes in Algorithm 1. Second, post-retraining accuracy can be roughly estimated by training on a small subset of training data for a handful of epochs. Third, the thief scheduler's decisions may not be impacted by small errors in the estimations.

The above insights are incorporated in the example micro-profiling approaches described herein, where for each video, various retraining configurations are tested on a small subset of the retraining data for a relatively small number of epochs (well before models converge). The micro-profiler has been found to be nearly 100× more efficient than exhaustive profiling (of all configurations on the entire training data) in experiments, while predicting accuracies with an error of 5.8%, which is low enough in practice to mostly ensure that the thief scheduler makes the same decisions as it would with a fully accurate prediction.

The following techniques help to make the example micro-profiler highly efficient. First, the micro-profiler works on a small fraction (e.g., 5%-10%) of the training data in the retraining window (which is already a subset of all the videos accumulated in the retraining window). In some examples, weighted sampling techniques may be used for the micro-profiling. However, random sampling may be indicative of the configuration's performance on the full training data since it preserves all the data distributions and variations.

Second, similar to data sampling, the micro-profiler tests each configuration of a superset of configurations for a small number (e.g., 5) of training epochs, and then terminates the testing early, well before convergence. Compared to a full-fledged profiling process that takes few tens of epochs to converge, such early termination greatly speeds up the micro-profiling process. After early termination on the sampled training data, the (validation) accuracy of each configuration is obtained at each epoch it was trained. The accuracy-epoch points are then fit to a non-linear curve model using a non-negative least squares solver. Examples of non-linear curve models are described in Y. Peng, Y. Bao, Y. Chen, C. Wu, and C. Guo, "Optimus: An efficient dynamic resource scheduler for deep learning clusters", Proceedings of the Thirteenth EuroSys Conference, EuroSys '18; 2018. Examples of non-negative least squares solvers are described in "scipy.optimize.nnls", scipy v1.5.2 reference guide. https://docs.scipy.org/doc/scipy/reference/generated/scipy.optimize.nnls.html, (Accessed on Sep. 17, 2020). This model is then used to extrapolate the accuracy that would be obtained by retraining with all the data for larger number of epochs.

Third, the micro-profiler also can prune out configurations for micro-profiling (and hence, for retraining) that have historically not been useful. These are configurations that are usually significantly distant from the configurations on a Pareto curve of a resource-accuracy profile (see FIG. 3B), and thus unlikely to be picked by the thief scheduler. Avoiding these configurations may improve the efficiency of the micro-profiling. As such, in some examples, the superset of configurations that the micro-profiler tests may not comprise all possible configurations in some examples.

As mentioned above, for both the micro-profiling as well as the retraining, labels may be acquired using a golden model, which is a more comprehensive, higher cost but higher accuracy model trained on a larger dataset. The golden model may not be able to keep up with inference on the live videos and is thus used to label a small subset of the videos for retraining.

The following paragraphs provide additional details regarding the implementation of the machine learning models, thief scheduler, and micro-profiler. In some examples, the machine learning models are run and trained using PyTorch (A. Paszke, S. Gross, F. Massa, A. Lerer, J. Bradbury, G. Chanan, T. Killeen, Z. Lin, N. Gimelshein, L. Antiga, A. Desmaison, A. Kopf, E. Yang, Z. DeVito, M. Raison, A. Tejani, S. Chilamkurthy, B. Steiner, L. Fang, J. Bai, and S. Chintala, "Pytorch: An imperative style, high-performance deep learning library", Advances in Neural Information Processing Systems 32, pp. 8024-8035, 2019).

A collection of logically distributed modules are used for ease of scale-out to many video streams and resources. Each module may act as either the scheduler, micro-profiler, or a training/inference job, and can be implemented by a long-running "actor". One example of an actor abstraction is described in P. Moritz, R. Nishihara, S. Wang, A. Tummy, R. Liaw, E. Liang, M. Elibol, Z. Yang, W. Paul, M. I. Jordan, and I. Stoica, "Ray: A dis-tributed framework for emerging ai applications", Proceedings of the 13th USENIX Conference on Operating Systems Design and Implementation, OSDI '18, pp. 561-577, 2018. A benefit of using the actor abstraction is its highly optimized initialization cost and failure recovery.

GPU resources may be reallocated between training and inference jobs at timescales that are far more dynamic than other frameworks where the GPU allocations for jobs may be fixed upfront. While a middle layer can provide resource isolation in the GPU by intercepting calls and re-scheduling them, it may also terminate and restart a process to change its resource allocation. However, the restarting costs may be avoided by the actor-based implementation that keeps DNN model in GPU memory.

The resource allocations produced by the thief scheduler may be "continuous", assuming that fractional resources can be spanned across two discrete GPUs. To avoid expensive inter-GPU communication, the allocations may be quantized to inverse powers of two (e.g., ½, ¼, ⅛). This may make the jobs amenable to packing. The jobs may then be allocated to GPUs in descending order of demands to reduce fragmentation.

Inference accuracy can be improved by checkpointing the model during retraining and dynamically loading it as the inference model. Checkpointing can, however, disrupt both the retraining and the inference jobs, Accordingly, the cost of the disruption due to checkpointing (e.g., additional delay on retraining and inference) may be weighed against its benefits (e.g., the more accurate model is available sooner). The actor-based programming model allows for queuing of requests when the actor (model) is unavailable when its new weights are being loaded, thus allowing checkpointing to be implemented relatively easily.

When the accuracy during the retraining varies from the expected value from micro-profiling, resource allocations may be adjusted reactively. Every few epochs (e.g., every 5 epochs), the current accuracy of the model being retrained is used to estimate its eventual accuracy when all the epochs are complete. The expected accuracy is updated in the profile of the retraining ($\Gamma$) with the new value, and then Algorithm 1 is run again for new resource allocations (but leaves the configuration that is used currently, $\gamma$, to be unchanged).

The performance of the machine learning models, thief scheduler, and micro-profiler were evaluated against static retraining baselines. Compared to static retraining baselines, up to 29% higher accuracy was achieved. As described in more detail below, for the baseline to match this accuracy, it would utilize 4x additional GPU resources. Both the micro-profiling and the thief scheduler contribute to these gains. In particular, the micro-profiler estimates accuracy with low median errors of 5.8%. The thief scheduler efficiently made its decisions in 9.4 s for 10 video streams across 8 GPUs with 18 configurations per model and a 200 s retraining window. Compared to alternate designs, including retraining the models in the cloud or using pre-trained cached models, a higher accuracy was achieved without associated network costs.

On-road videos captured by dashboard cameras as well as urban videos captured by mounted cameras were used in the evaluation. The dashboard camera videos were Waymo Open (P. Sun et al., "Scalability in perception for autonomous driving: Waymo open dataset", 2019) (1000 video segments with in total 200K frames) and Cityscapes (5K frames captured by 27 cameras), from cars driving through cities in the US and Europe. The urban videos were from stationary cameras mounted in a building ("Urban Building") as well as from five traffic intersections ("Urban Traffic"), both collected over 24-hour durations. A retraining window of 200 seconds was used, and each of the videos was split into 200 second segments. Since the Waymo and Cityscapes dataset do not contain continuous timestamps, retraining windows were created by concatenating images from the same camera in chronological order to form a long video stream, which was split into 200 second segments.

The ResNet18 object classifier model was used as an edge DNN. ResNeXt 101 (H. Wang et al., "Elastic: Improving cnns with dynamic scaling policies", Proceedings of the IEEE Conference on Computer Vision and Pattern Recognition, pp. 2258-2267, 2019) was used as a golden model to obtain ground truth labels for training and testing. On a subset of data that have human annotations, the labels produced by the golden model were confirmed to be very similar to human-annotated labels.

The implementation was run on AMAZON ELASTIC COMPUTE CLOUD (AWS EC2) provided by Amazon Web Services, Inc. of Seattle, WA For 1 GPU, p3.2xlarge instances were used. For 2 GPU experiments, p3.8xlarge instances were used. Each instance had V100 GPUs provided by Nvidia Corporation of Santa Clara, CA with NVLINK interconnects and SKYLAKE XEON processors provided by Intel Corporation of Santa Clara, CA.

A simulator was also built to test the implementation under a wide range of resource constraints, workloads, and longer durations. The simulator took as input the accuracy and resource usage (in GPU time) of training/inference configurations logged from a testbed. For each training job in a window, the training-accuracy progression was logged over GPU-time. The inference accuracy was also logged on the real videos to replay in the simulator. This allowed the jobs to be mimicked with high fidelity under different scheduling policies.

As described above, retraining configurations were obtained by combining the following hyperparameters: number of epochs to train, batch size, number of neurons in the last layer, number of layers to retrain, and a fraction of data between retraining windows to use for retraining. As a baseline, a uniform scheduler used (a) a fixed retraining configuration, and (b) a static retraining/inference resource allocation. For each dataset, all retraining configurations were tested on a hold-out dataset (e.g., two video streams that were not used in later tests) to produce a Pareto frontier of the accuracy-resource tradeoffs (see, e.g., FIG. 3). The same hold-out dataset was used to customize the off-the-shelf DNN inference model. The uniform scheduler then picked two points on the Pareto frontier as the fixed retraining configurations to represent "high" (Config 1) and "low" (Config 2) resource usage and used one of them for all retraining windows in a test.

Two alternative designs were also considered: (1) offloading re-training to the cloud, and (2) caching and re-using a retrained model from history. These approaches are described in more detail below.

The example implementation and the baselines were evaluated along three dimensions—inference accuracy (% of images correctly classified), resource consumption (in GPU time), and capacity (the number of concurrently processed video streams). The performance was tested while keeping up with the original video frame rate (e.g., without indefinite frame queueing).

Figure 6A:
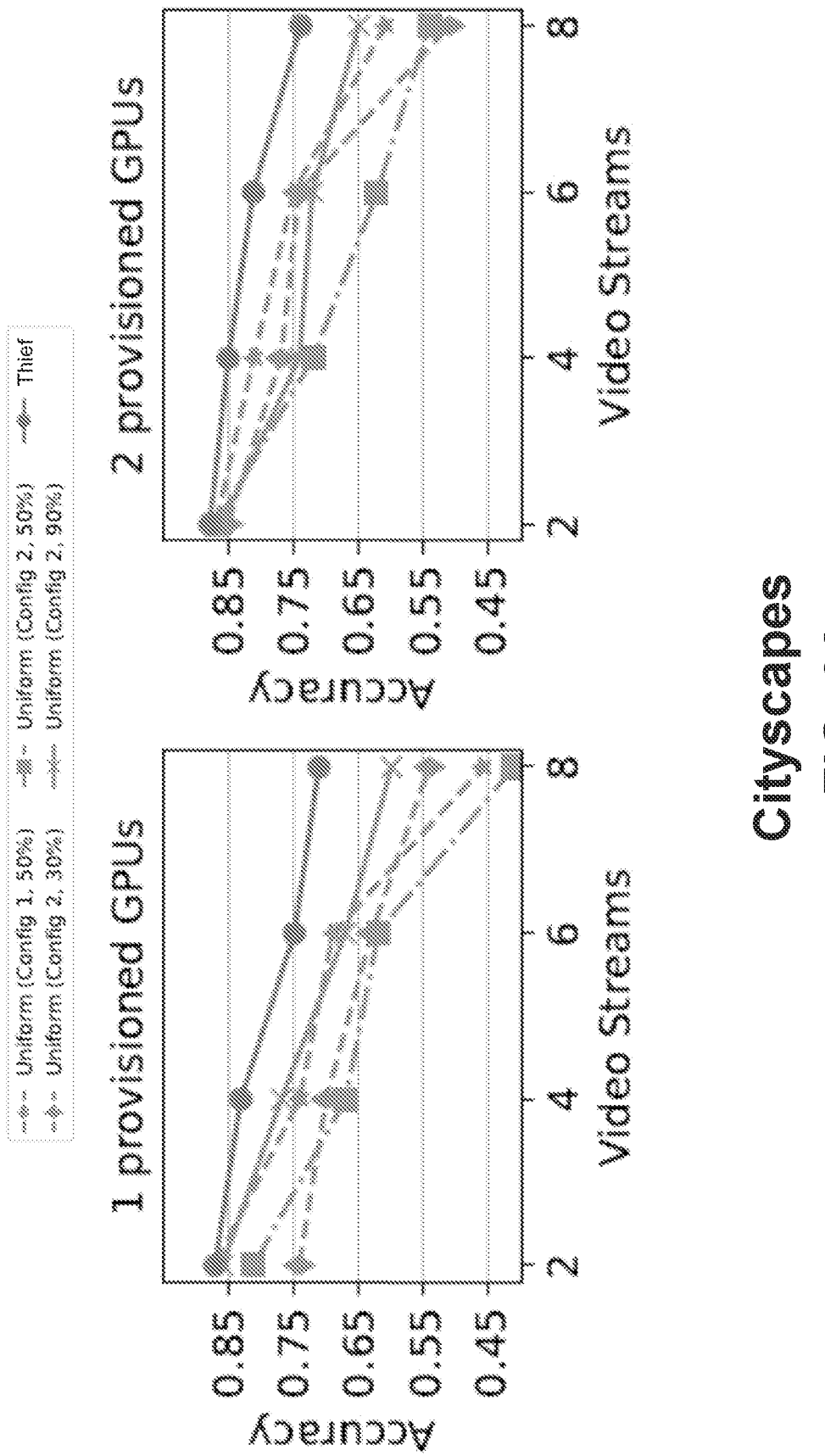
FIGS. 6A and 6B show graphs depicting inference accuracies for different continuous retraining schedulers as a function of a number of video streams for one and two provisioned graphics processing units (GPUs).
Figure 6B:
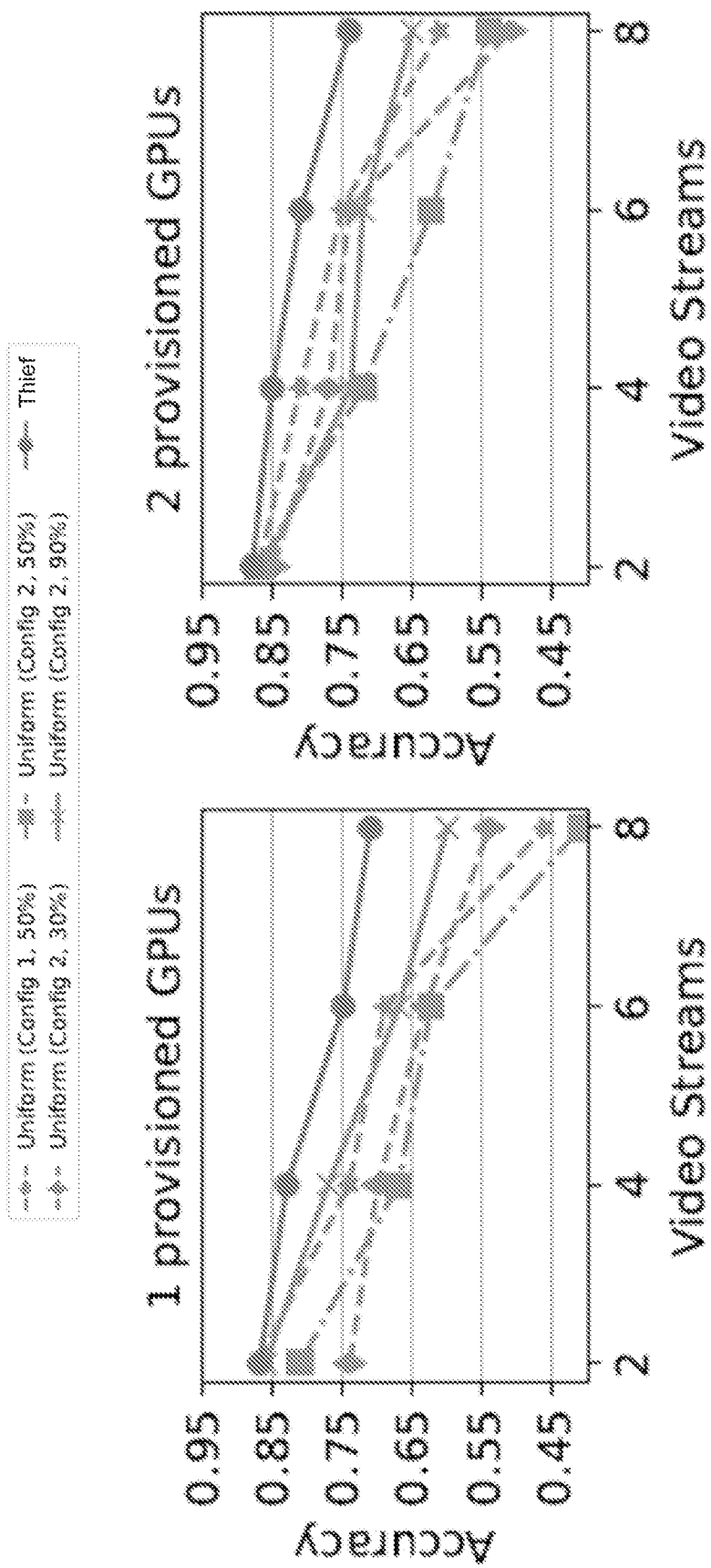
Figure 7A:
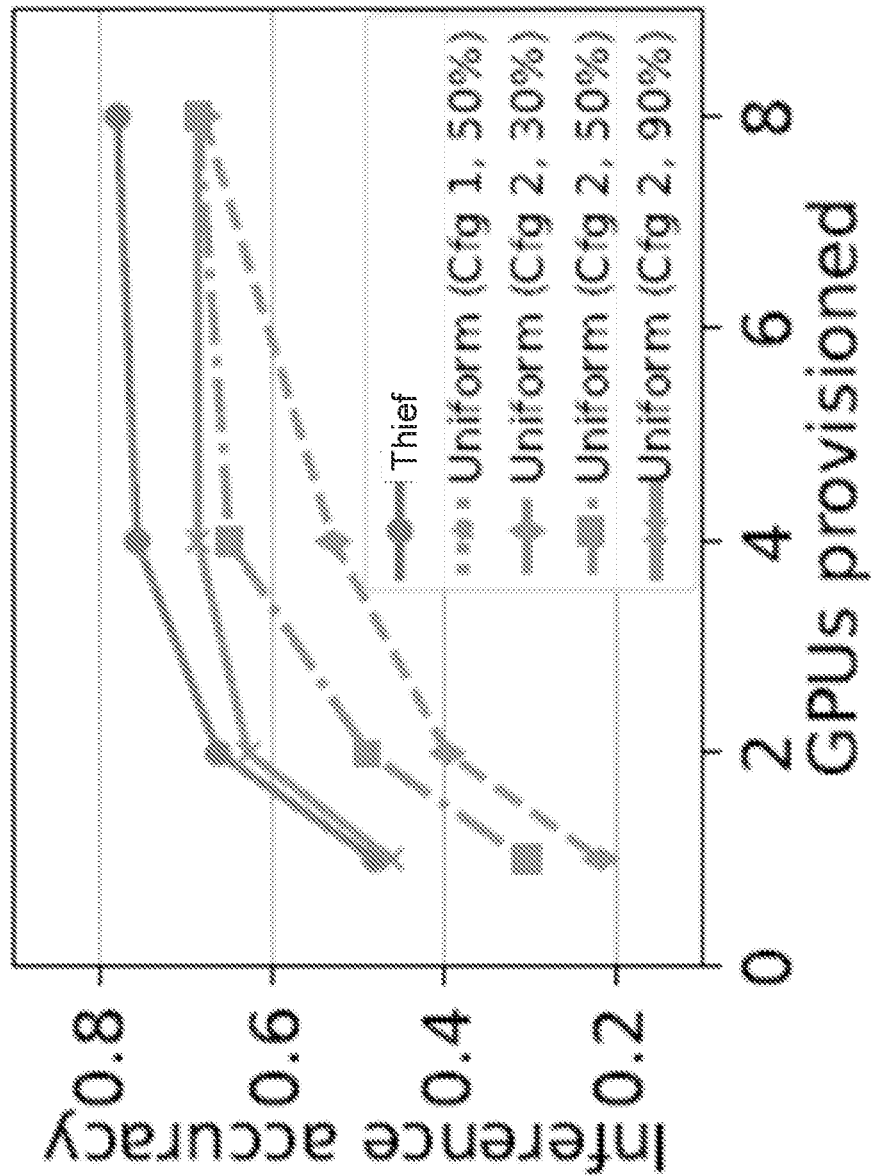
FIGS. 7A-7D show graphs depicting inference accuracies for of different schedulers when processing 10 video streams provisioned with varying numbers of GPUs.
Figure 7B:
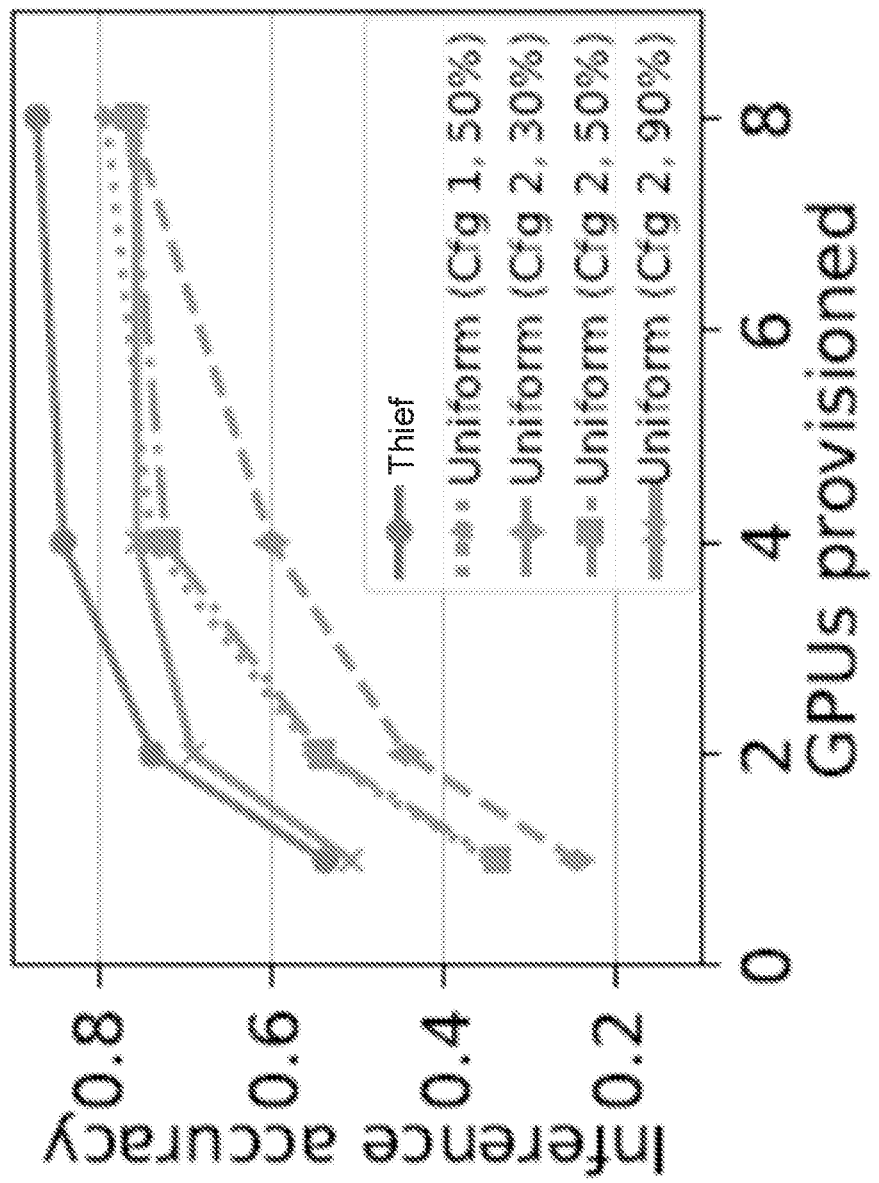
Figure 7C:
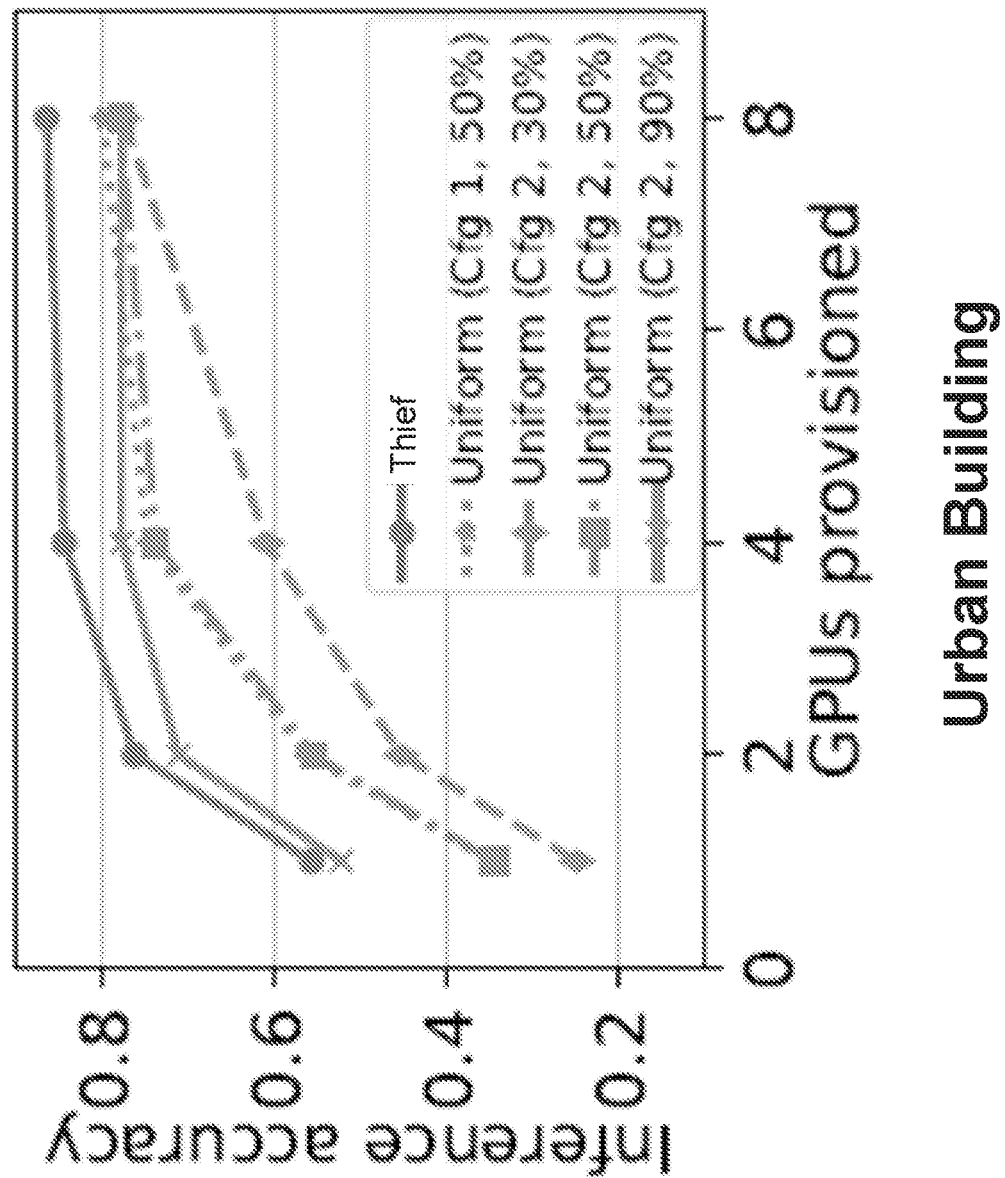
Figure 7D:
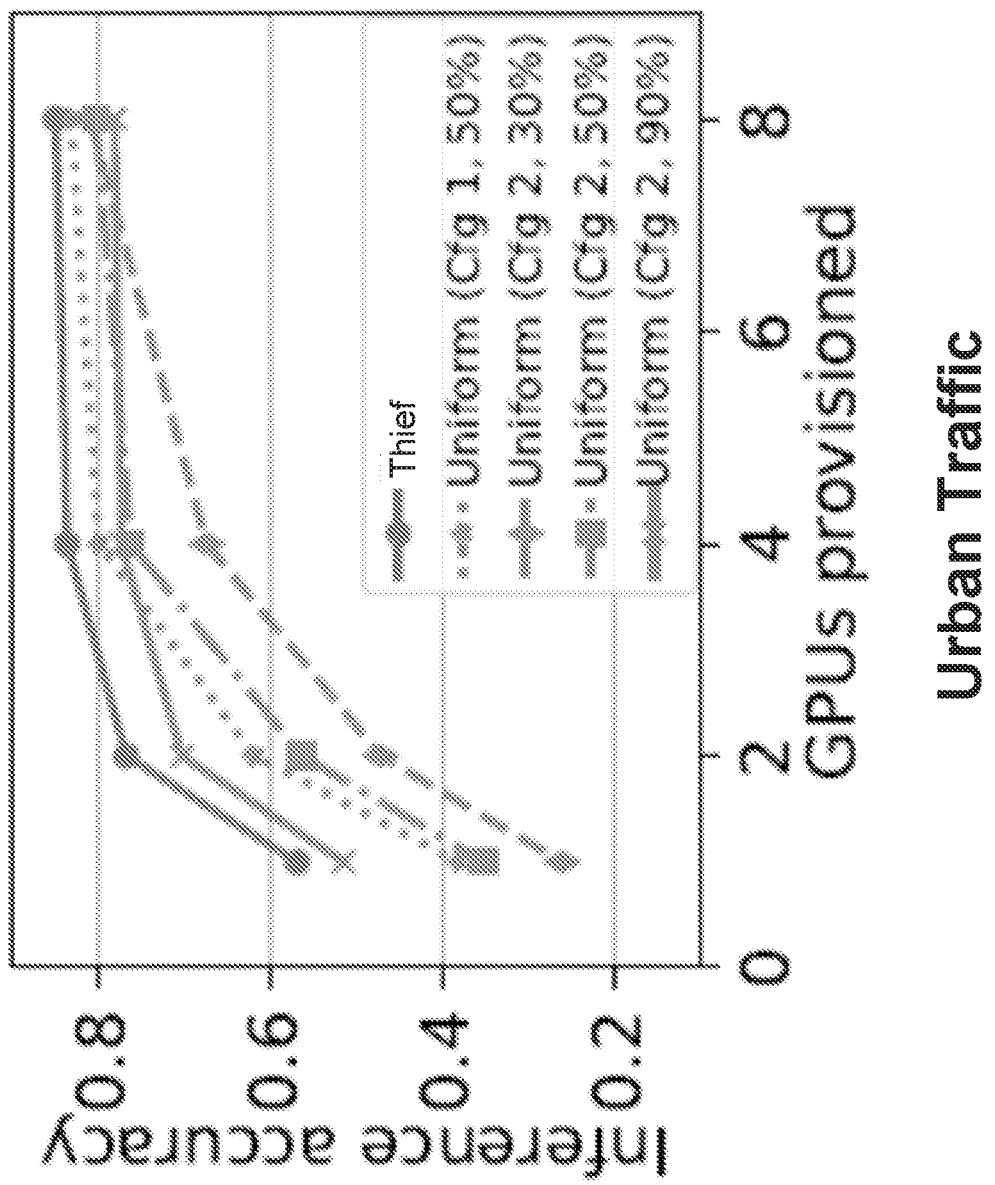

FIGS. 6A and 6B show plots of accuracy when more video streams are added using different schedulers. When more video streams share the same resources, accuracy degrades more slowly using the thief scheduler, while the uniform baselines' accuracy drops faster. ("Uniform (Config 1, 90%)" indicates that the uniform scheduler allocates 90% GPU resource to inference and 10% to retraining).

FIGS. 6A and 6B plot the accuracy of the thief scheduler and the uniform baselines when analyzing a growing number of concurrent video streams under a fixed number of provisioned GPUs for the Waymo and Cityscapes datasets. The uniform baselines use different combinations of predetermined retraining configurations and resource partitionings. As the number of video streams increased, the thief scheduler enjoyed a growing advantage (up to 29% under 1 GPU and 23% under 2 GPU) in accuracy over the uniform baselines. This may be because more resources were gradually shifted from retraining to inference and cheaper retraining configurations were used. In contrast, increasing the number of streams forced the uniform baseline to allocate less GPU cycles to each inference job, while retraining jobs, which use fixed configurations, slowed down and took the bulk of each window. This trend persisted with different GPUs.

The capacity of the thief scheduling approach (e.g., the maximum number of concurrent video streams subject to an accuracy threshold is compared with that of the uniform baseline, as more GPUs are available. An accuracy threshold may be set, since some applications may not be usable when accuracy is below the threshold in some instances.

As shown below in Table 3, results from the Cityscapes dataset (see also FIG. 6A) were used to derive a scaling factor of capacity vs. a number of provisioned GPUs and shows that with more provisioned GPUs, faster scaling was achieved with an example thief scheduler as disclosed compared to the uniform baselines.

TABLE 3

Capacity (number of video streams that can be concurrently supported subject to accuracy target 0.75) vs. number of provisioned GPUs.

| Scheduler | Capacity | | |
|---|---|---|---|
| | 1 GPU | 2 GPUS | Scaling factor |
| Thief | 2 | 8 | 4x |
| Uniform (Config 1, 50%) | 2 | 2 | 1x |
| Uniform (Config 2, 90%) | 2 | 4 | 2x |
| Uniform (Config 2, 50%) | 2 | 4 | 2x |
| Uniform (Config 2, 30%) | 0 | 2 | — |

With reference now to FIGS. 7A-7D, a stress test was performed to process 10 concurrent video streams. FIGS. 7A-7D shows the inference accuracy of different schedulers when processing 10 video streams provisioned with varying numbers of GPUs. The simulator was used to scale to more GPUs, using profiles recorded from real tests, which was verified to produce similar results as the implementation at small-scale. As the number of provisioned GPUs was increased, the higher accuracy of the two baselines was consistently outperformed by a considerable margin. In addition, with 4 GPUs, higher accuracy (marked with the dotted horizontal line) was achieved than the baselines at 16 GPUs (e.g., 4× resource saving).

The results highlight two advantages of the scheduler. First, it allocates resources to retraining when the accuracy gain from the retraining outweighs the temporary inference accuracy drop due to frame subsampling. Second, when it allocates resource to retraining, it retrains the model with a configuration that can finish in time for the inference to leverage the higher accuracy from the retrained model.

Figure 8:
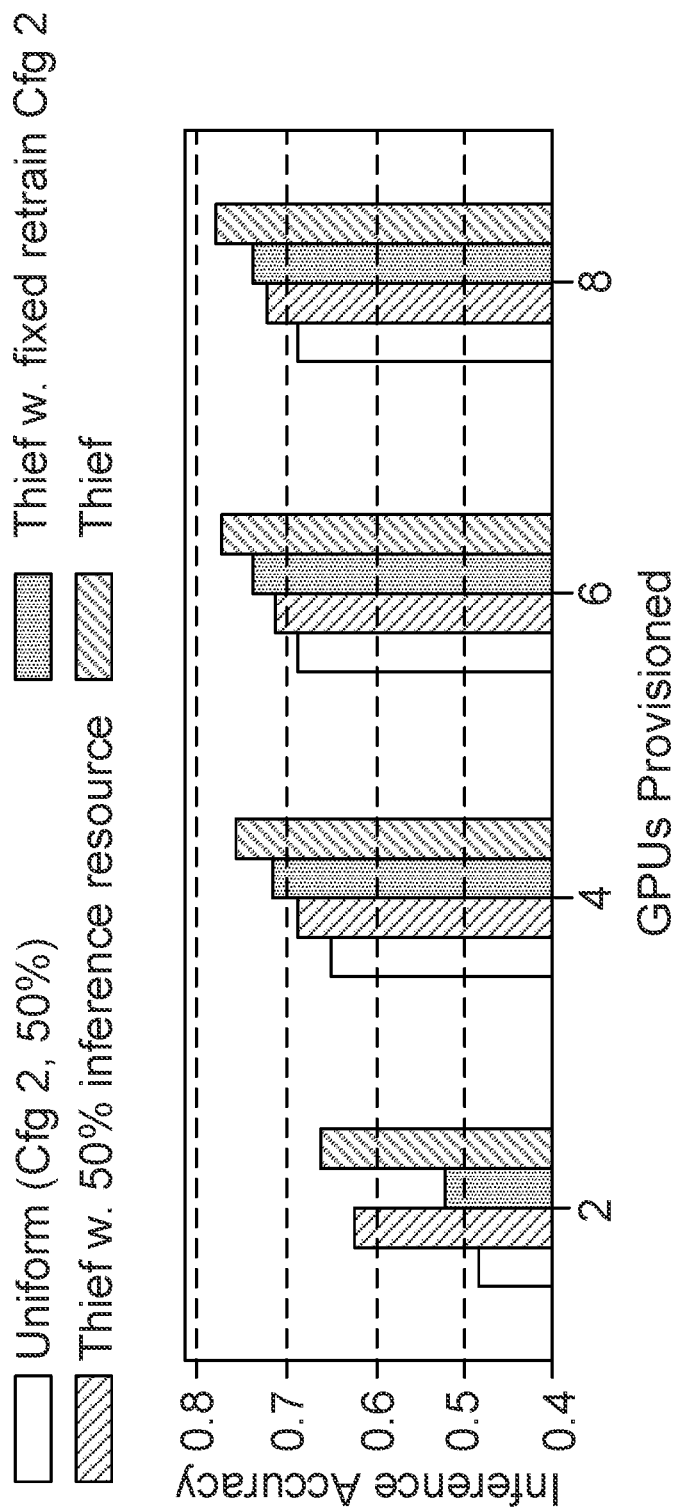
FIG. 8 shows a graph depicting inference accuracies as a function of whether dynamic resource allocation and/or retraining configuration adaption is used.

FIG. 8 shows a plot of a factor analysis showing the impact of removing dynamic resource allocation or removing retraining configuration adaptation on 10 video streams with 4 GPUs provisioned. Two variants were constructed: FixedRes, which removes smart resource allocation (e.g., using the inference/training resource partition of the uniform baseline), and FixedConfig, which removes micro-profiling-based configuration selection (e.g., using the fixed configuration of the uniform baseline). As illustrated by example in FIG. 8, both adaptive resource allocation and configuration selection had a substantial contribution to the observed gains in accuracy, especially when the system was under stress (e.g., when fewer resources are provisioned).

Figure 9A:
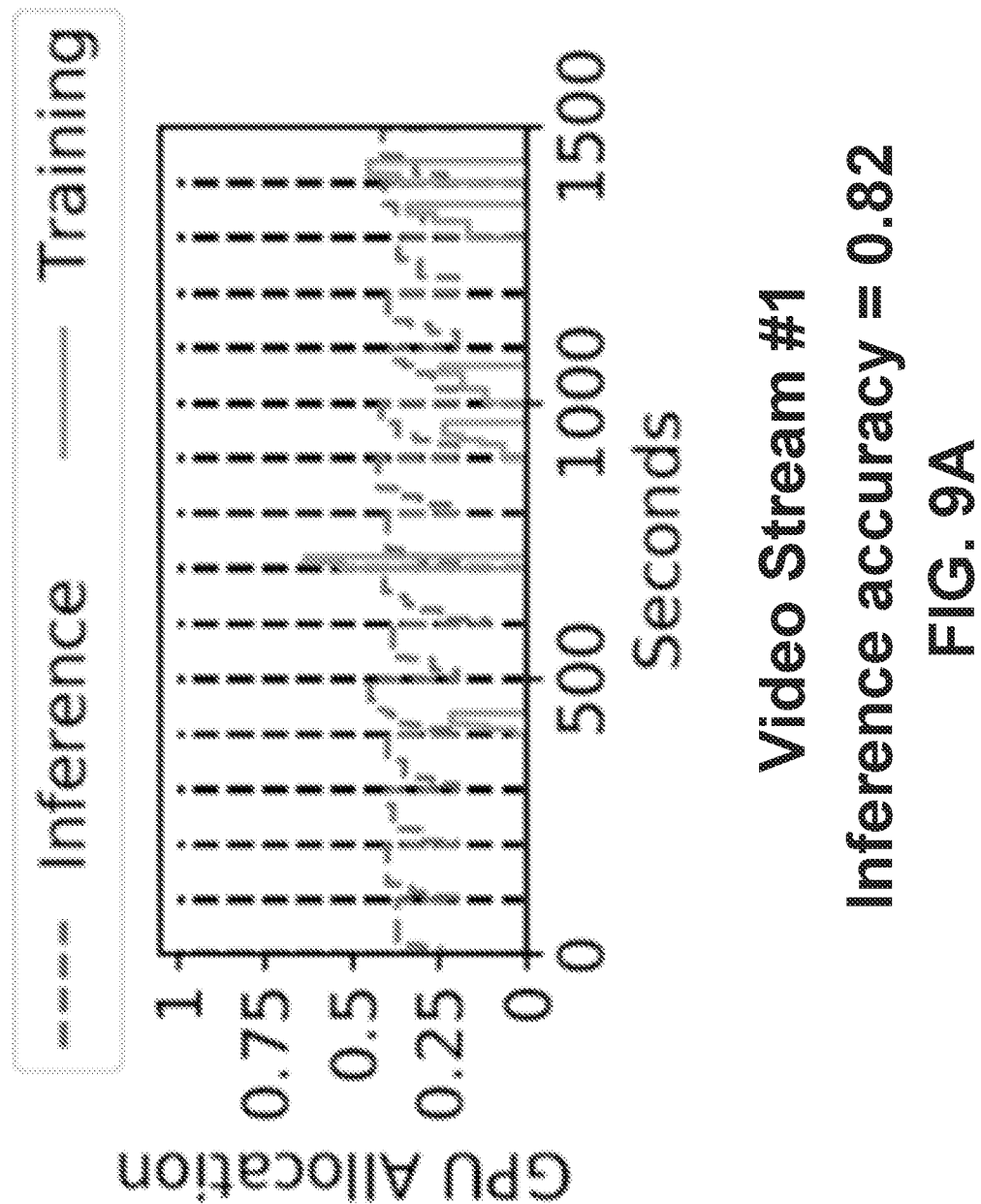

FIGS. 9A and 9B show a plot of GPU allocation for two "Urban Building" video streams over several retraining windows. Unlike the uniform baseline, resource allocation was adapted to retrain each stream's model based on the retraining benefit to each stream. In contrast to the uniform baselines that use the same retraining configuration and allocate equal resource to retraining and inference (when retraining takes place), the model implementation was retrained when it benefitted from the retraining, and different amounts of GPUs were allocated to the retraining jobs of video streams, depending on how much accuracy gain was expected from retraining on each stream. As illustrated by example in FIGS. 9A and 9B, more computing resources were diverted to video stream #1 (e.g., #1 can benefit more from retraining than #2) and both video streams achieved higher accuracies (0.82 and 0.83) than the uniform baseline.

Figure 10:
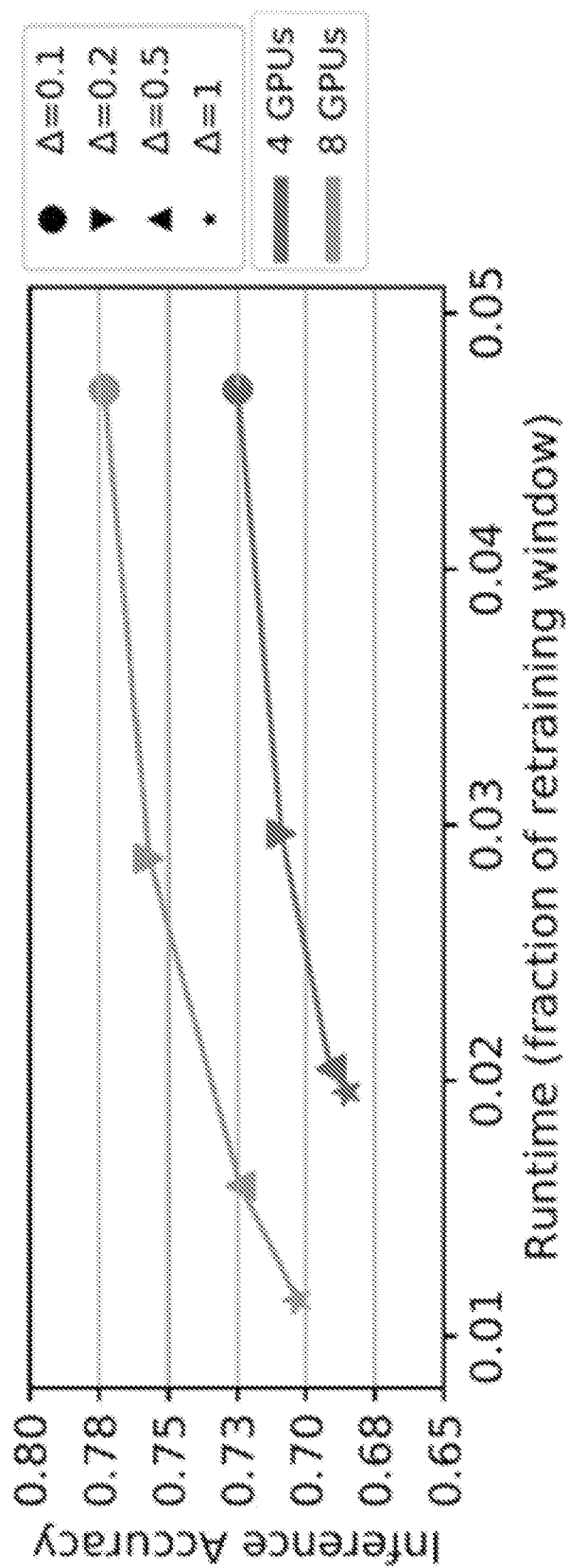
FIG. 10 shows a plot of inference accuracy over time for different values of Δ for an example thief scheduler.

FIG. 10 shows a plot of inference accuracy over time for different values of Δ, which is the allocation quantum used by the thief scheduler when reallocating resources from victims to the thief. As illustrated by example in FIG. 10, smaller values increased the runtime (though still a tiny fraction of a retraining window of 200 s) but improved the accuracy. While increasing Δ from 1.0 (coarse-grained; one full GPU) to 0.1 (fine-grained; fraction of a GPU), the accuracy increased substantially (~8%). Though the runtime also increased to 9.5 seconds, it was still a small fraction (4.7%) of the retraining window (200 s), and Δ=0.1 was used.

Figure 11A:
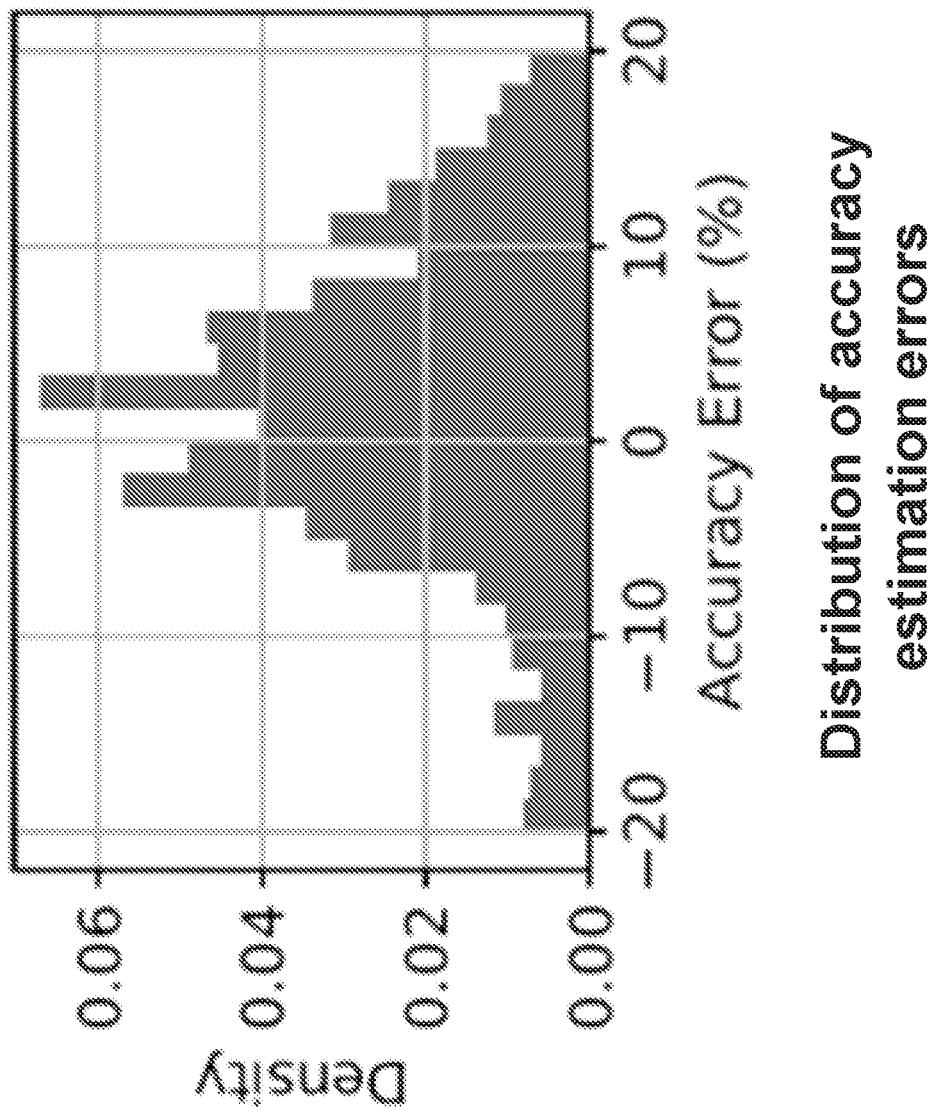
FIG. 11A shows a graph illustrating a distribution of inference accuracy errors of extrapolated inference accuracies generated by a microprofiler compared to observed inference accuracies.
Figure 11B:
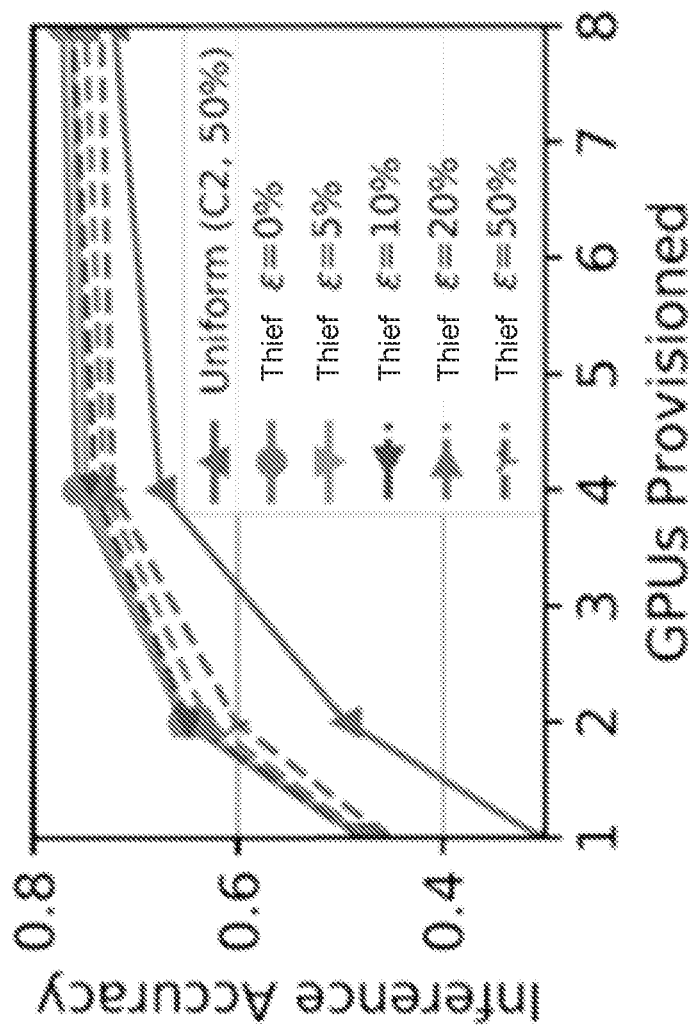
FIG. 11B shows a graph illustrating an inference accuracy of a continuous retraining process that utilizes an example thief scheduler compared to a uniform scheduler, and illustrates a robustness of each against microprofiler inference accuracy estimation errors.

FIGS. 11A and 11B show plots illustrating performance of an example microprofiler. FIG. 11A shows a distribution of the micro-profilers actual estimation errors. FIG. 11B shows the robustness of the thief scheduler against the micro-profiler's estimation errors.

As described above, the micro-profiler estimates the accuracy of each configuration by training it on a subset of the data for a small number of epochs. To evaluate the micro-profiler's estimates, it was run on all configurations for 5 epochs and on 10% of the retraining data from all streams of the Cityscapes dataset, and the estimation error was calculated with respect to the retrained accuracies when trained on 100% of the data for 5, 15 and 30 epochs. FIG. 11A plots the distribution of the errors in accuracy estimation and shows that the micro-profiled estimates were largely unbiased with a median absolute error of 5.8%.

The impact of accuracy estimation errors on inference accuracy was tested. A controlled Gaussian noise was added on top of the real retraining accuracy as the predictions when the microprofiler was queried. As shown in FIG. 11B, the inference accuracy was quite robust to accuracy estimate errors: with up to 20% errors (in which all errors in FIG. 11A lie) in the profiler prediction, the maximum accuracy drop observed was 3%.

In contrast to edge-based retraining, one may upload a sub-sampled video stream to the cloud, retrain the model in the cloud, and download the model to an edge server. While not a desirable option for many use cases due to bandwidth, privacy, and connection reliability issues, it was evaluated against the edge-based retraining as it lets the edge servers focus on inference. The cloud-based solution resulted in lower accuracy due to network delays on constrained networks in which edge devices may operate.

As a simple example, eight video streams were considered with a ResNet18 model and a retraining window of 400 seconds. For a HD (720 p) video stream at 4 Mbps and 10% data sub-sampling (used for many of the examples disclosed herein), this amounted to 160 Mb of training data per camera per window. Uploading 160 Mb for each of the 8 cameras over a 4G cellular uplink (e.g., at 5.1 Mbps) and downloading the trained ResNet18 models (e.g., each of size of 398 Mb) over a 17.5 Mbps downlink took a total of 432 seconds (even excluding the model retraining time), which already exceeds the retraining window.

To test on the Cityscapes dataset, the simulator was extended to account for network delays during retraining and tested with 8 videos and 4 GPUs. Retraining in the cloud was assumed to be "instantaneous" as cloud GPUs are more powerful than edge GPUs. Table 4 lists the accuracies with cellular 4G links (one and two subscriptions) and a satellite link, which are both indicative of edge deployments. Two cellular links were used to meet a 400 s retraining window.

TABLE 4

Retraining in the cloud under different networks versus the edge implementation. The edge implementation achieves better accuracy without using expensive satellite and cellular links.

| | Bandwidth (Mbps) | | | Additional bandwidth | |
| --- | --- | --- | --- | --- | --- |
| | Uplink | Downlink | Accuracy | Uplink | Downlink |
| Cellular | 5.1 | 17.5 | 68.5% | 10.2x | 3.8x |
| Satellite | 8.5 | 15 | 69.2% | 5.9x | 4.4x |
| Cellular (2x) | 10.2 | 35 | 71.2% | 5.1x | 1.9x |
| Edge | — | — | 77.8% | — | — |

The cloud alternatives would consume additional uplink capacity of 5×-10× and downlink capacity of 2×-4× (of the already expensive links) to match the accuracy of edge-based retraining. In summary, the edge-based solution provides higher accuracy and lower network usage (sending no data out of the edge) while preserving privacy.

Another alternative to edge-based continuous retraining is to cache retrained models and reuse them, e.g., picking a model that was trained on a similar class distribution. To test this baseline, a few tens of DNNs were pretrained and cached from earlier retraining windows from the Cityscapes dataset. In each retraining window with 8 GPUs and 10 video streams, the cached DNN was picked whose class distribution (vector of object class frequencies) of its training data had the closest Euclidean distance with the current window's data. GPU cycles were evenly shared by the inference jobs (since there is no retraining). The resulting average inference accuracy was 0.72, lower than the edge-based continuous retraining accuracy of 0.78 (see FIG. 7A). This may be because, even though the class distributions may be similar, the models may not be directly reused from any window as the appearances of objects may still differ considerably (see also FIG. 2).

By deploying computation close to data sources, edge computing may benefit many applications, including video analytics. The techniques disclosed herein enable joint optimization of video inference and retraining.

Figure 12A:
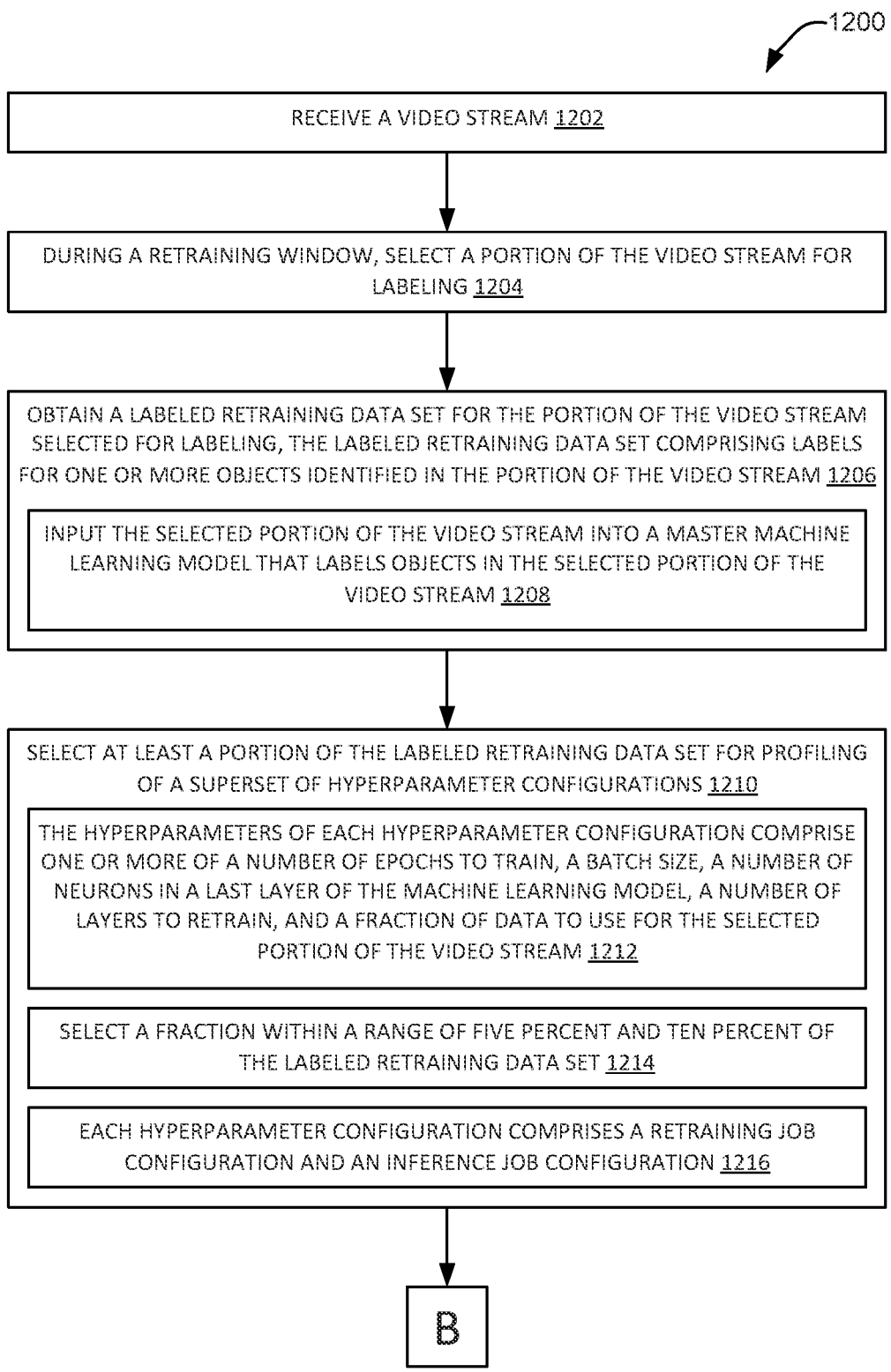
FIGS. 12A and 12B show a flow diagram depicting an example of a computer-implemented method for operating a microprofiler that selects hyperparameter configurations for use in retraining and inferencing.
Figure 12B:
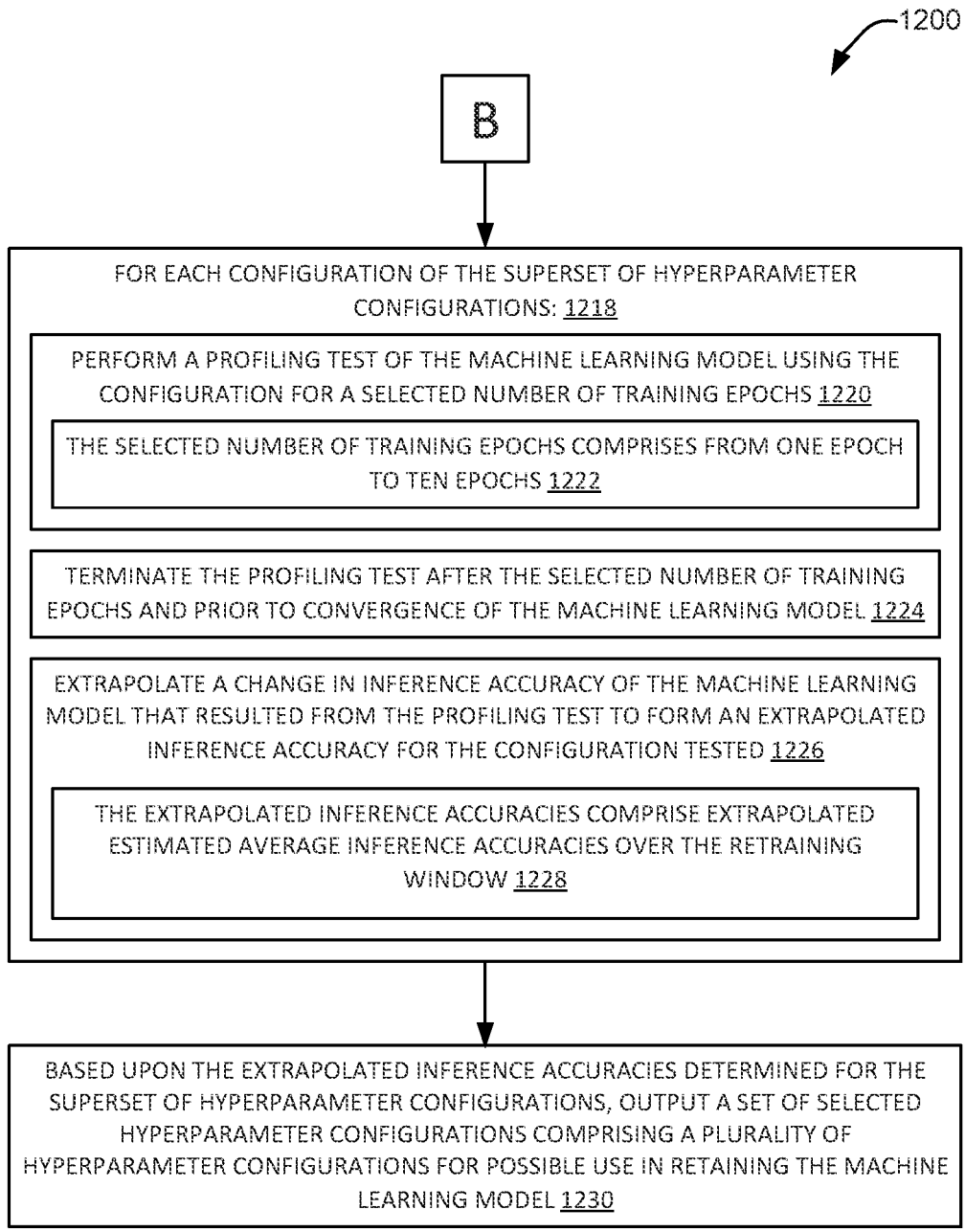

FIGS. 12A-12B show a flow diagram depicting an example of a computer-implemented method 1200 for operating a machine learning model configured to analyze video and to retrain the machine learning model. The following description of method 1200 is provided with reference to the examples disclosed herein, but it will be appreciated that method 1200 also may be performed in other contexts.

With reference to FIG. 12A, at 1202, the method 1200 comprises receiving a video stream. At 1204, the method 1200 comprises, during a retraining window, selecting a portion of the video stream for labeling. At 1206, the method 1200 comprises obtaining a labeled retraining data set for the portion of the video stream selected for labeling, the labeled retraining data set comprising labels for one or more objects identified in the portion of the video stream. At 1208, the method 1200 may include obtaining the labeled retraining data set by inputting the selected portion of the video stream into a more comprehensive machine learning model that labels objects in the selected portion of the video stream.

At 1210, the method 1200 comprises selecting at least a portion of the labeled retraining data set for profiling of a superset of hyperparameter configurations. As indicated at 1212, in some examples the hyperparameters of each hyperparameter configuration comprise one or more of a number of epochs to train, a batch size, a number of neurons in a last layer of the machine learning model, a number of layers to retrain, and a fraction of data to use for the selected portion of the video stream. As indicated at 1214, in some examples the instructions are executable to select at least the portion of the labeled retraining data set by selecting a fraction within a range of five percent and ten percent of the labeled retraining data set. As indicated at 1216, each hyperparameter configuration can comprise a retraining job configuration and an inference job configuration.

With reference now to FIG. 12B, at 1218, the method 1200 comprises, for each configuration of the superset of hyperparameter configurations, performing processes 1220, 1224, and 1226. At 1220, the method 1200 comprises performing a profiling test of the machine learning model using the configuration for a selected number of training epochs. As indicated at 1222, in some examples, the selected number of training epochs comprises from one epoch to ten epochs. In other examples, any other suitable number of epochs can be used.

At 1224, the method 1200 comprises terminating the profiling test after the selected number of training epochs and prior to convergence of the machine learning model. At 1226, the method 1200 comprises extrapolating a change in inference accuracy of the machine learning model that resulted from the profiling test to form an extrapolated inference accuracy for the configuration tested. As indicated at 1228, the extrapolated inference accuracies can comprise extrapolated estimated average inference accuracies over the retraining window.

At 1230, the method 1200 comprises, based upon the extrapolated inference accuracies determined for the superset of hyperparameter configurations, outputting a set of selected hyperparameter configurations comprising a plurality of hyperparameter configurations for possible use in retaining the machine learning model.

Figure 13A:
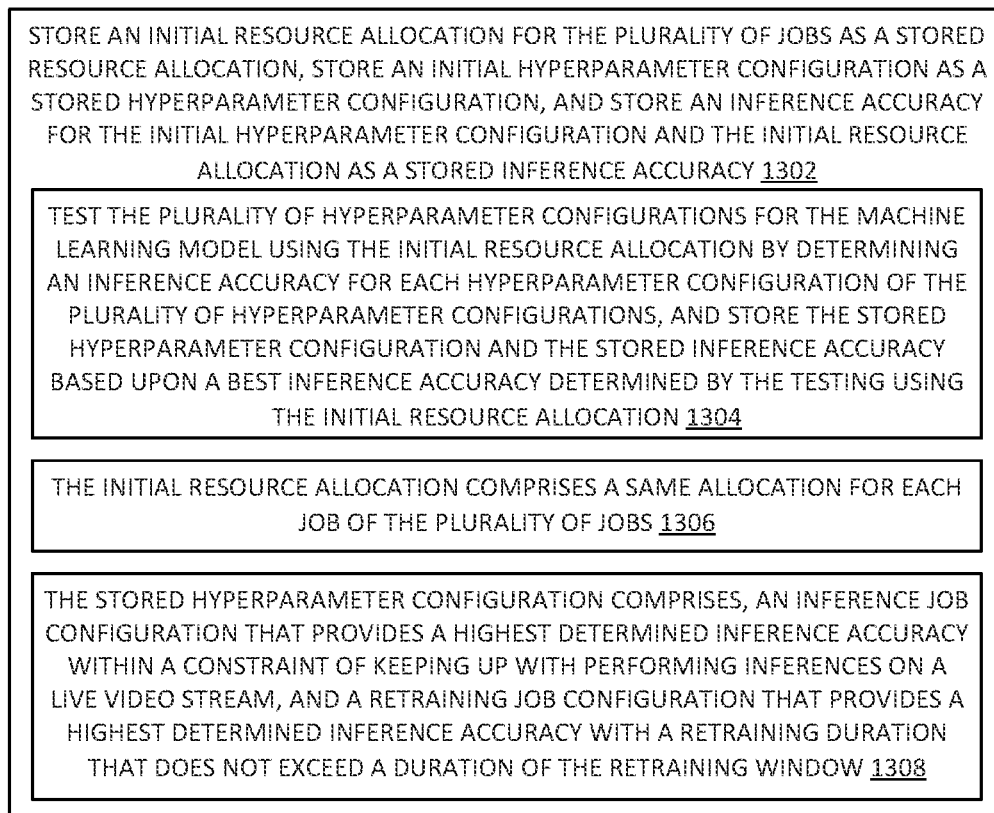
FIGS. 13A-13C show a flow diagram depicting an example of a computer-implemented method for allocating computing resources and selecting hyperparameter configurations during continuous retraining and operation of a machine learning model using a thief scheduler.
Figure 13B:
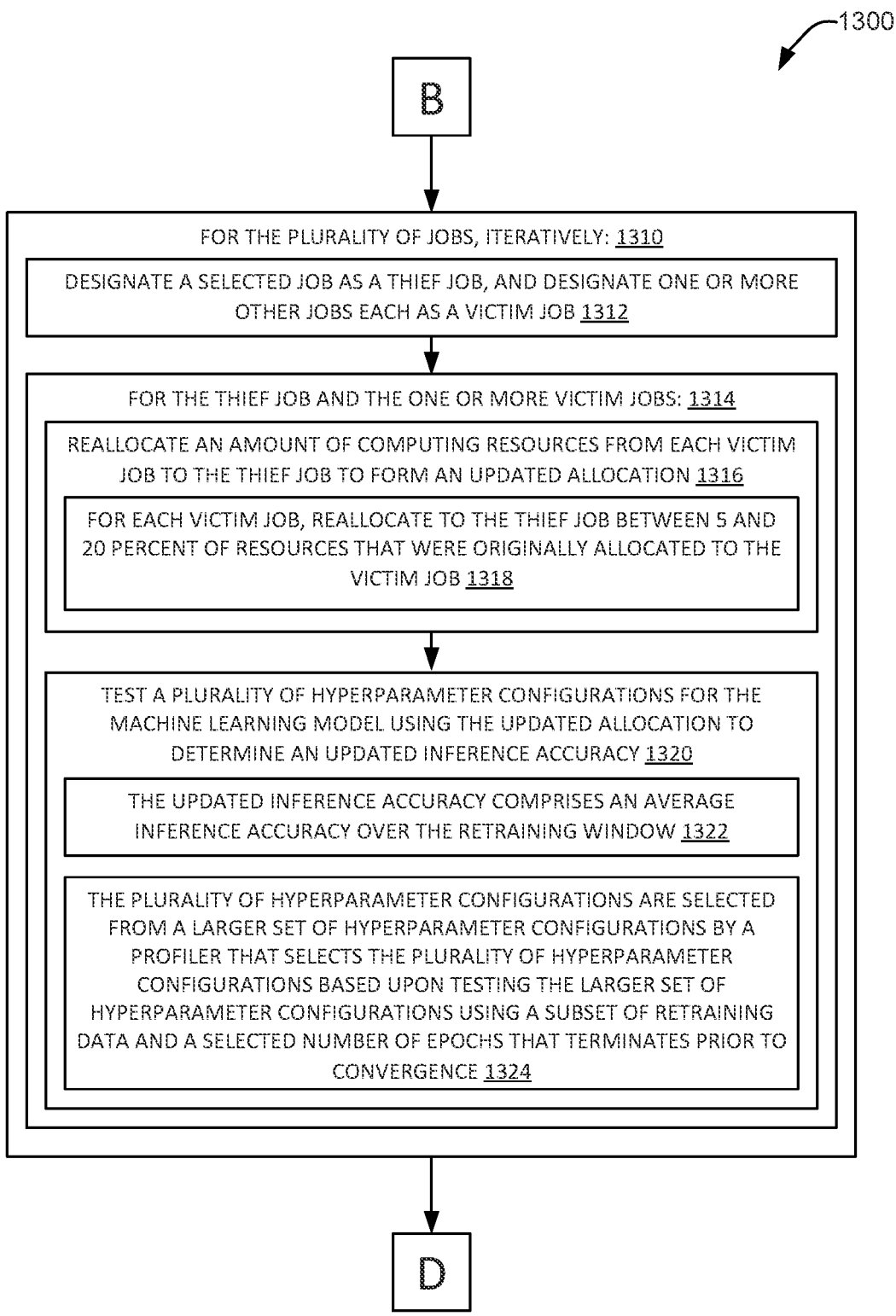
Figure 13C:
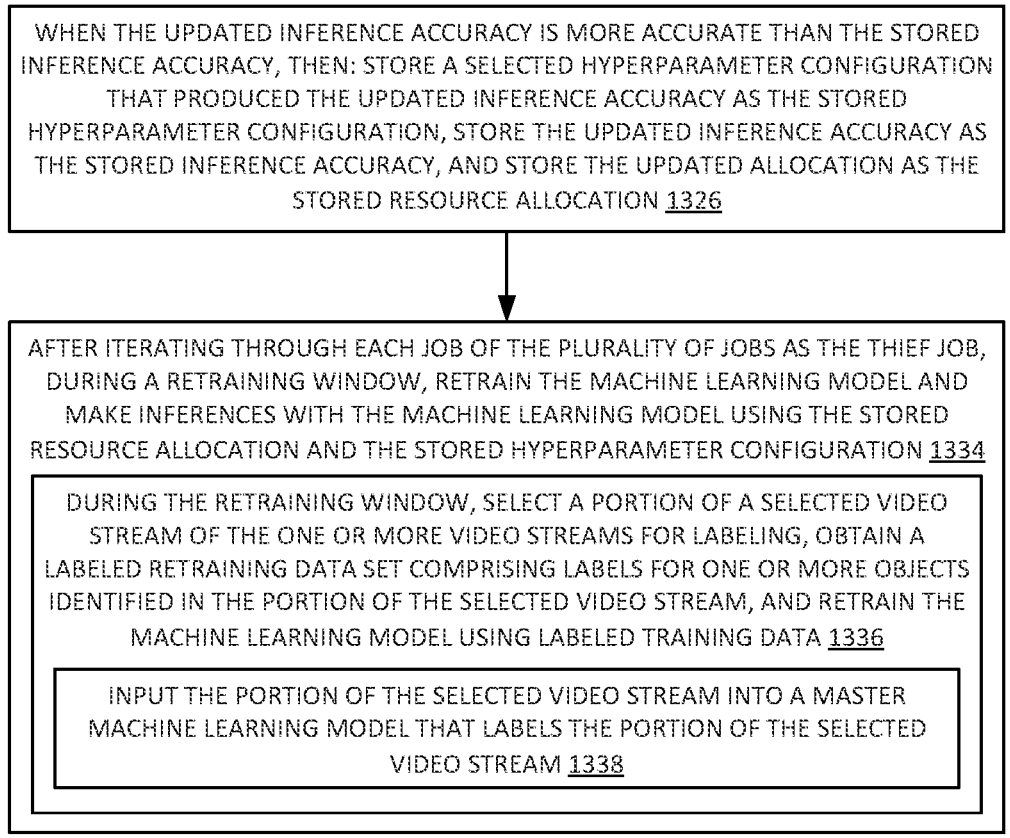

FIGS. 13A-13C shows a flow diagram depicting an example of a computer-implemented method 1300 for allocating computing resources and selecting hyperparameter configurations during continuous retraining and operation of a machine learning model using a thief scheduler. The following description of method 1300 is provided with reference to the examples described herein, but it will be appreciated that method 1300 also may be performed in other contexts.

With reference to FIG. 13A, at 1302, the method 1300 comprises storing an initial resource allocation for the plurality of jobs as a stored resource allocation, storing an initial hyperparameter configuration as a stored hyperparameter configuration, and storing an inference accuracy for the initial hyperparameter configuration and the initial resource allocation as a stored inference accuracy. As indicated at 1304, storing the initial hyperparameter configuration as the stored hyperparameter configuration, storing the inference accuracy for the initial hyperparameter configuration, and storing initial resource allocation as the stored inference accuracy may comprise testing the plurality of hyperparameter configurations for the machine learning model using the initial resource allocation by determining an inference accuracy for each hyperparameter configuration of the plurality of hyperparameter configurations, and storing the stored hyperparameter configuration and the stored inference accuracy based upon a best inference accuracy determined by the testing using the initial resource allocation. As indicated at 1306, in some examples the initial resource allocation comprises a same allocation for each job of the plurality of jobs. As indicated at 1308, the stored hyperparameter configuration may comprise an inference job configuration that provides a highest determined inference accuracy within a constraint of keeping up with performing inferences on a live video stream, and a retraining job configuration that provides a highest determined inference accuracy with a retraining duration that does not exceed a duration of the retraining window.

With reference now to FIG. 13B, at 1310, the method 1300 includes, for the plurality of jobs, iteratively performing processes 1312, 1314, 1316, 1320, and optionally 1326. At 1312, the method 1300 includes designating a selected job as a thief and designating one or more other jobs each as a victim.

At 1314, method 1300 includes, for the thief and the one or more victims, performing steps 1316, 1320, and 1326. At 1316, the method 1300 includes reallocating an amount of computing resources from each victim to the thief to form an updated allocation. As indicated at 1318, reallocating the amount of computing resources may comprise, for each victim, reallocating to the thief between 5 and 20 percent of resources that were originally allocated to the victim.

At 1320, the method 1300 includes testing a plurality of hyperparameter configurations for the machine learning model using the updated allocation to determine an updated inference accuracy. As indicated at 1322, the updated inference accuracy may comprise an average inference accuracy over the retraining window. As indicated at 1324, the plurality of hyperparameter configurations may be selected from a larger superset of hyperparameter configurations by a profiler that selects the plurality of hyperparameter configurations based upon testing the larger superset of hyperparameter configurations using a subset of retraining data and a selected number of epochs that terminates prior to convergence.

At 1326, the method 1300 includes, when the updated inference accuracy is more accurate than the stored inference accuracy, storing a selected hyperparameter configuration that produced the updated inference accuracy as the stored hyperparameter configuration. The updated inference accuracy is stored as the stored inference accuracy, and the updated allocation is stored as the stored resource allocation.

The method 1300 further includes, at 1334, after iterating through each job of the plurality of jobs as the thief, during a retraining window, retraining the machine learning model and making inferences with the machine learning model using the stored resource allocation and the stored hyperparameter configuration. At 1336, the method 1300 may include, during the retraining window, selecting a portion of a selected video stream of the one or more video streams for labeling, obtaining a labeled retraining data set comprising labels for one or more objects identified in the portion of the selected video stream, and retraining the machine learning model using labeled training data. As indicated at 1338, obtaining the labeled retraining data set may comprise inputting the portion of the selected video stream more comprehensive model (a "golden model") that labels the portion of the selected video stream.

Figure 14:
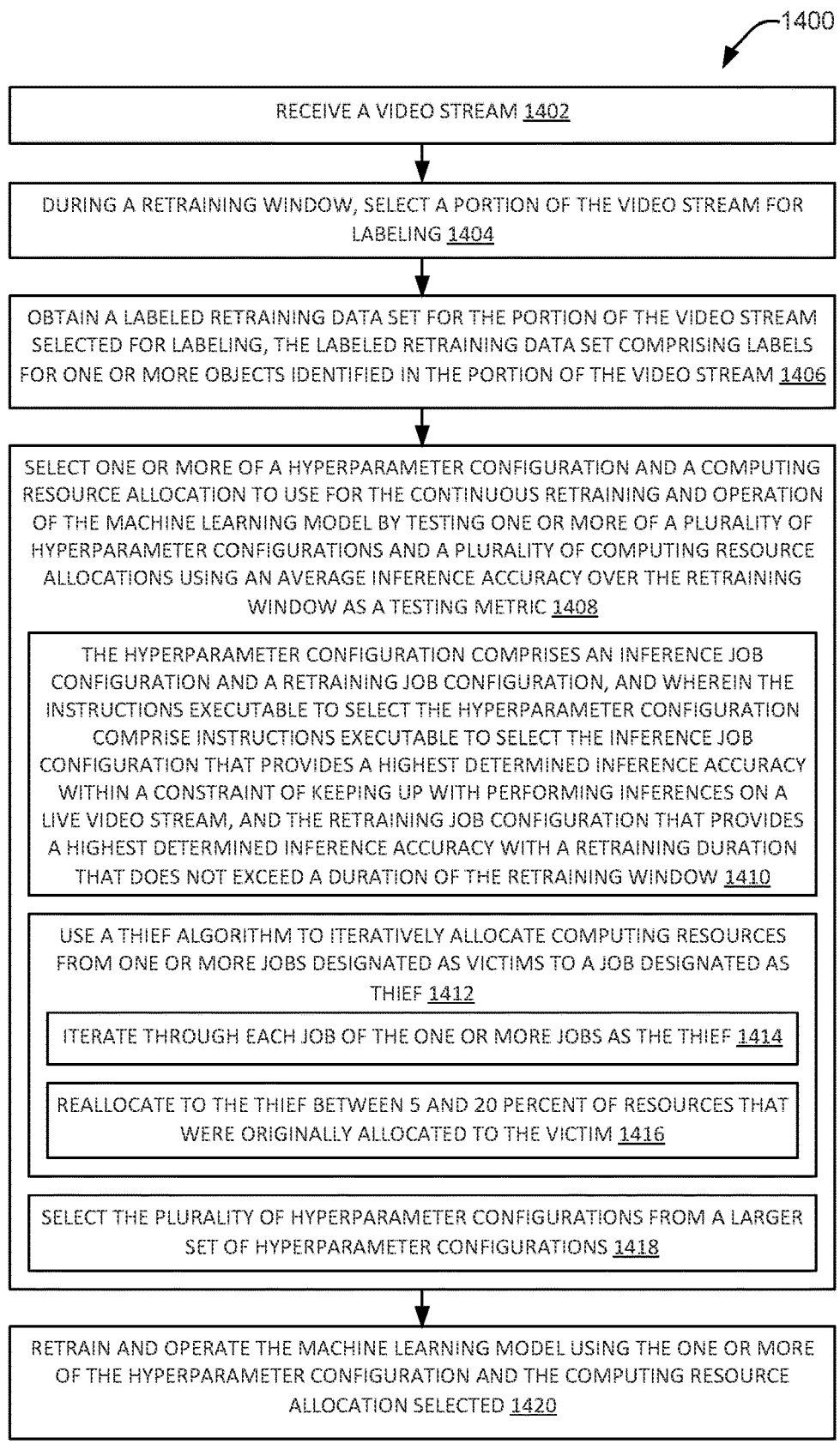
FIG. 14 shows a flow diagram depicting an example of a computer-implemented method for performing continuous retraining and operation of a machine learning model.

FIG. 14 shows a flow diagram depicting an example of a computer-implemented method 1400 for performing continuous retraining and operation of a machine learning model. The following description of method 1400 is provided with reference to the examples described herein, but it will be appreciated that method 1400 also may be performed in other contexts.

At 1402, the method 1400 comprises receiving a video stream. At 1404, the method 1400 comprises. during a retraining window, selecting a portion of the video stream for labeling. At 1406, the method 1400 comprises obtaining a labeled retraining data set for the portion of the video stream that was selected for labeling comprising labels for one or more objects identified in the portion of the video stream. As described above, the labeled retraining data set may be obtained by inputting the selected retraining data set into a more comprehensive machine learning model (a golden model).

At 1408, the method 1400 comprises selecting one or more of a hyperparameter configuration and a computing resource allocation to use for the continuous retraining and operation of the machine learning model by testing one or more of a plurality of hyperparameter configurations and a plurality of computing resource allocations using an average inference accuracy over the retraining window as a testing metric.

As indicated at 1410, the hyperparameter configuration may comprise an inference job configuration and a retraining job configuration, and the instructions executable to select the hyperparameter configuration may comprise instructions executable to select the inference job configuration that provides a highest determined inference accuracy within a constraint of keeping up with performing inferences on a live video stream; and the retraining job configuration that provides a highest determined inference accuracy with a retraining duration that does not exceed a duration of the retraining window.

As indicated at 1412, a thief algorithm may be used to iteratively allocate computing resources from one or more jobs designated as victims to a job designated as thief. In such an example, as indicated at 1414, the thief algorithm may iterate through each job of the one or more jobs as the thief. Further as indicated at 1416, the thief algorithm may reallocate to the thief between 5 and 20 percent of resources that were originally allocated to the victim.

At 1418, the plurality of hyperparameter allocations that are tested can comprise a plurality of hyperparameter configurations from a larger set of hyperparameter configurations. At 1420, the method 1400 includes retraining and operating the machine learning model using the one or more of the hyperparameter configuration and the computing resource allocation selected.

Figure 15:
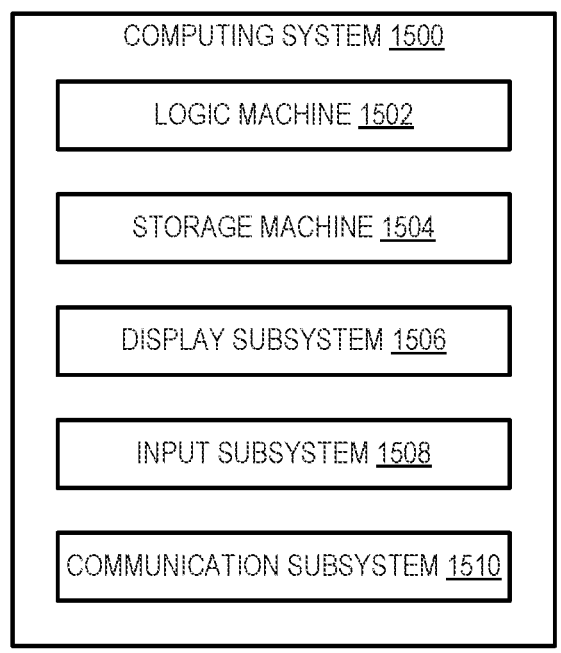
FIG. 15 shows a block diagram of an example of a computing system.

FIG. 15 schematically shows an example of a computing system 1500 that can enact one or more of the methods and processes described above. Computing system 1500 is shown in simplified form. Computing system 1500 may take the form of one or more personal computers, server computers, tablet computers, home-entertainment computers, network computing devices, gaming devices, mobile computing devices, mobile communication devices (e.g., smart phone), and/or other computing devices.

Computing system 1500 includes a logic machine 1502 and a storage machine 1504. Computing system 1500 may optionally include a display subsystem 1506, input subsystem 1508, communication subsystem 1510, and/or other components not shown in FIG. 15.

Logic machine 1502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1504 includes one or more physical devices configured to hold instructions executable by the logic machine to implement the methods and processes described herein. When such methods and processes are implemented, the state of storage machine 1504 may be transformed—e.g., to hold different data.

Storage machine 1504 may include removable and/or built-in devices. Storage machine 1504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1504 may include volatile, nonvolatile, dynamic, static, read/write, read-only, random-access, sequential-access, location-addressable, file-addressable, and/or content-addressable devices.

It will be appreciated that storage machine 1504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1502 and storage machine 1504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1500 implemented to perform a particular function. In some cases, a program may be instantiated via logic machine 1502 executing instructions held by storage machine 1504. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1506 may be used to present a visual representation of data held by storage machine 1504. This visual representation may take the form of a graphical user interface (GUI). As the herein described methods and processes change the data held by the storage machine, and thus transform the state of the storage machine, the state of display subsystem 1506 may likewise be transformed to visually represent changes in the underlying data. Display subsystem 1506 may include one or more display devices utilizing virtually any type of technology. Such display devices may be combined with logic machine 1502 and/or storage machine 1304 in a shared enclosure, or such display devices may be peripheral display devices.

When included, input subsystem 1508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1510 may be configured to communicatively couple computing system 1500 with one or more other computing devices. Communication subsystem 1510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1500 to send and/or receive messages to and/or from other devices via a network such as the Internet.

Another aspect provides a computing device configured to be located at a network edge between a local network and a cloud service, the computing device comprising a processor; and a memory storing instructions executable by the processor to operate a machine learning model configured to analyze video and to retrain the machine learning model by: receiving a video stream; during a retraining window, selecting a portion of the video stream for labeling of objects in the video; obtaining a labeled retraining data set for the portion of the video stream selected for labeling, the labeled retraining data set comprising labels for one or more objects identified in the portion of the video stream; selecting at least a portion of the labeled retraining data set for profiling of a superset of hyperparameter configurations; for each configuration of the superset of hyperparameter configurations, performing a profiling test of the machine learning model using the configuration for a selected number of training epochs, terminating the profiling test after the selected number of training epochs and prior to convergence of the machine learning model, and extrapolating a change in inference accuracy of the machine learning model that resulted from the profiling test to form an extrapolated inference accuracy for the configuration tested; and based upon the extrapolated inference accuracies determined for the superset of hyperparameter configurations, output a set of selected hyperparameter configurations comprising a plurality of hyperparameter configurations for possible use in retaining the machine learning model. The computing device may additionally or alternatively include, wherein the instructions are executable to obtain the labeled retraining data set by inputting the selected portion of the video stream into a more comprehensive machine learning model that labels objects in the selected portion of the video stream. The computing device may additionally or alternatively include, wherein the hyperparameters of each hyperparameter configuration comprise one or more of a number of epochs to train, a batch size, a number of neurons in a last layer of the machine learning model, a number of layers to retrain, and a fraction of data to use for the selected portion of the video stream. The computing device may additionally or alternatively include, wherein the instructions are executable to select at least the portion of the labeled retraining data set by selecting a fraction within a range of five percent and ten percent of the labeled retraining data set. The computing device may additionally or alternatively include, wherein the selected number of training epochs comprises from one epoch to ten epochs. The computing device may additionally or alternatively include, wherein each hyperparameter configuration comprises a retraining job configuration and an inference job configuration. The computing device may additionally or alternatively include, wherein the extrapolated inference accuracies comprise extrapolated estimated average inference accuracies over the retraining window.

Another aspect provides, on a computing device comprising a machine learning model configured to analyze video data, a method for allocating computing resources and selecting hyperparameter configurations during continuous retraining and operation of the machine learning model, the continuous retraining and operation comprising a plurality of jobs including, for each video stream of one or more video streams, an inference job and a retraining job, the method comprising storing an initial resource allocation for the plurality of jobs as a stored resource allocation, storing an initial hyperparameter configuration as a stored hyperparameter configuration, and storing an inference accuracy for the initial hyperparameter configuration and the initial resource allocation as a stored inference accuracy; for the plurality of jobs, iteratively: designating a selected job of the plurality of jobs as a thief, and designating one or more other jobs each as a victim; for the thief and the one or more victim, reallocating an amount of computing resources from each victim to the thief to form an updated allocation, testing a plurality of hyperparameter configurations for the machine learning model using the updated allocation to determine an updated inference accuracy, and when the updated inference accuracy is more accurate than the stored inference accuracy, then storing a selected hyperparameter configuration that produced the updated inference accuracy as the stored hyperparameter configuration, storing the updated inference accuracy as the stored inference accuracy, and storing the updated allocation as the stored resource allocation; and after iterating through each job of the plurality of jobs as the thief, during a retraining window, retraining the machine learning model and making inferences with the machine learning model using the stored resource allocation and the stored hyperparameter configuration. The method may additionally or alternatively include, wherein storing the initial hyperparameter configuration as the stored hyperparameter configuration and storing the inference accuracy for the initial hyperparameter configuration and initial resource allocation as the stored inference accuracy comprises testing the plurality of hyperparameter configurations for the machine learning model using the initial resource allocation by determining an inference accuracy for each hyperparameter configuration of the plurality of hyperparameter configurations; and storing the stored hyperparameter configuration and the stored inference accuracy based upon a best inference accuracy determined by the testing using the initial resource allocation. The method may additionally or alternatively include, wherein the updated inference accuracy comprises an average inference accuracy over the retraining window. The method may additionally or alternatively include, wherein the initial resource allocation comprises a same allocation for each job of the plurality of jobs. The method may additionally or alternatively include, during the retraining window, selecting a portion of a selected video stream of the one or more video streams for labeling, obtaining a labeled retraining data set comprising labels for one or more objects identified in the portion of the selected video stream, and retraining the machine learning model using labeled training data. The method may additionally or alternatively include, wherein obtaining the labeled retraining data set comprises inputting the portion of the selected video stream into a more comprehensive machine learning model that labels the portion of the selected video stream. The method may additionally or alternatively include, wherein the plurality of hyperparameter configurations are selected from a larger set of hyperparameter configurations by a profiler that selects the plurality of hyperparameter configurations based upon testing the larger set of hyperparameter configurations using a subset of retraining data and a selected number of epochs that terminates prior to convergence. The method may additionally or alternatively include, wherein the stored hyperparameter configuration comprises an inference job configuration that provides a highest determined inference accuracy within a constraint of keeping up with performing inferences on a live video stream; and a retraining job configuration that provides a highest determined inference accuracy with a retraining duration that does not exceed a duration of the retraining window. The method may additionally or alternatively include, wherein reallocating the amount of computing resources comprises, for each victim, reallocating to the thief between 5 and 20 percent of resources that were originally allocated to the victim.

Another aspect provides a computing device configured to be located at a network edge between a local network and a cloud service, the computing device comprising a processor; and a memory storing instructions executable by the processor to perform continuous retraining and operation of a machine learning model configured to analyze video, the continuous retraining and operation comprising a plurality of jobs including, for each video stream of one or more video streams, a retraining job and an inference job, wherein the instructions are executable to: receive a video stream; during a retraining window, select a portion of the video stream for labeling; obtain a labeled retraining data set for the portion of the video stream that was selected for labeling comprising labels for one or more objects identified in the portion of the video stream; select one or more of a hyperparameter configuration and a computing resource allocation to use for the continuous retraining and operation of the machine learning model by testing one or more of a plurality of hyperparameter configurations and a plurality of computing resource allocations using an average inference accuracy over the retraining window as a testing metric; and retrain and operate the machine learning model using the one or more of the hyperparameter configuration and the computing resource allocation selected. The computing device may additionally or alternatively include, wherein the hyperparameter configuration comprises an inference job configuration and a retraining job configuration, and wherein the instructions executable to select the hyperparameter configuration comprise instructions executable to select the inference job configuration that provides a highest determined inference accuracy within a constraint of keeping up with performing inferences on a live video stream; and the retraining job configuration that provides a highest determined inference accuracy with a retraining duration that does not exceed a duration of the retraining window. The computing device may additionally or alternatively include, wherein the instructions executable to select the computing resource allocation comprise using a thief algorithm to iteratively allocate computing resources from one or more jobs designated as victims to a job designated as thief. The computing device may additionally or alternatively include, wherein the instructions are executable to select the plurality of hyperparameter configurations from a larger set of hyperparameter configurations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device configured to be located at a network edge between a local network and a cloud service, the computing device comprising:
   a processor; and
   a memory storing instructions executable by the processor to operate a machine learning model configured to analyze a video stream and to retrain the machine learning model by performing operations comprising:
      receiving the video stream;
      during a retraining window, obtaining a labeled retraining data set for a selected portion of the video stream, the labeled retraining data set comprising labels for one or more objects identified in the selected portion of the video stream;
      selecting at least a portion of the labeled retraining data set for profiling each of a plurality of configurations, comprising:
         performing a profiling test of the machine learning model using each configuration,
         terminating the profiling test prior to convergence of the machine learning model, and
         extrapolating a change in inference accuracy of the machine learning model that resulted from the profiling test to form an extrapolated inference accuracy for each configuration tested; and
      based upon the extrapolated inference accuracy determined for each configuration of the plurality of configurations, output at least one configuration for use in retraining the machine learning model.

2. The computing device of claim 1, wherein the instructions are executable to obtain the labeled retraining data set by inputting the selected portion of the video stream into a more comprehensive machine learning model that labels objects in the selected portion of the video stream.

3. The computing device of claim 1, wherein each configuration comprises one or more of a number of epochs to train, a batch size, a number of neurons in a last layer of the machine learning model, a number of layers to retrain, and a fraction of data to use for the selected portion of the video stream.

4. The computing device of claim 1, wherein the instructions are executable to select at least a portion of the labeled retraining data set by selecting a fraction within a range of five percent and ten percent of the labeled retraining data set.

5. The computing device of claim 1, wherein the profiling test is performed for a selected number of training epochs, wherein the selected number of training epochs comprises from one epoch to ten epochs.

6. The computing device of claim 1, wherein each configuration comprises a retraining job configuration and an inference job configuration.

7. The computing device of claim 1, wherein the extrapolated inference accuracy determined for each configuration comprises an extrapolated estimated average inference accuracy over the retraining window.

8. On a computing device comprising a machine learning model configured to analyze one or more video streams, a method for allocating computing resources and selecting a configuration for the machine learning model, the method comprising:
  for a plurality of jobs corresponding to retraining and operation of the machine learning model, the plurality of jobs including at least one of an inference job and a retraining job, iteratively:
    designating a selected job of the plurality of jobs as a thief, and designating one or more other jobs each as a victim;
    reallocating an amount of computing resources from each victim to the thief to form an updated allocation,
    testing a plurality of configurations for the machine learning model using the updated allocation to determine an updated inference accuracy, and
    when the updated inference accuracy is more accurate than an initial stored inference accuracy of an initial resource allocation, then
      storing a selected configuration that produced the updated inference accuracy as a stored configuration,
      storing the updated inference accuracy as a stored inference accuracy, and
      storing the updated allocation as a stored resource allocation; and
  after iterating through each job of the plurality of jobs as the thief, during a retraining window, retraining the machine learning model and making an inference with the machine learning model using the stored resource allocation and the stored configuration.

9. The method of claim 8, further comprising:
  testing the plurality of configurations for the machine learning model using the initial resource allocation by determining an inference accuracy for each configuration of the plurality of configurations; and
  storing an initial configuration and storing the initial inference accuracy based upon a best inference accuracy determined by the testing using the initial resource allocation.

10. The method of claim 8, wherein the updated inference accuracy comprises an average inference accuracy over the retraining window.

11. The method of claim 8, wherein the initial resource allocation comprises a same allocation for each job of the plurality of jobs.

12. The method of claim 8, further comprising, during the retraining window, obtaining a labeled retraining data set for a selected portion of the one or more video streams, the labeled retraining data set comprising labels for one or more objects identified in the selected portion of the video stream, and retraining the machine learning model using the labeled retraining data set.

13. The method of claim 12, wherein obtaining the labeled retraining data set comprises inputting the selected portion of the video stream into a more comprehensive machine learning model that labels the portion of the selected video stream.

14. The method of claim 8, wherein the plurality of configurations are selected from a larger set of hyperparameter configurations by a profiler that selects the plurality of configurations based upon testing the larger set of hyperparameter configurations using a subset of retraining data and a selected number of epochs that terminates prior to convergence.

15. The method of claim 8, wherein the stored hyperparameter configuration comprises:
  an inference job configuration that provides a highest determined inference accuracy within a constraint of keeping up with performing inferences on a live video stream; and
  a retraining job configuration that provides a highest determined inference accuracy with a retraining duration that does not exceed a duration of the retraining window.

16. The method of claim 8, wherein reallocating the amount of computing resources comprises, for each victim, reallocating to the thief between 5 and 20 percent of resources that were originally allocated to the victim.

17. A computing device configured to be located at a network edge between a local network and a cloud service, the computing device comprising:
  a processor; and
  a memory storing instructions executable by the processor to perform continuous retraining and operation of a machine learning model configured to analyze one or more video streams, the continuous retraining and operation comprising a plurality of jobs including, for each video stream of the one or more video streams, a retraining job and an inference job, wherein the instructions are executable to:
    receive a video stream;
    during a retraining window, obtain a labeled retraining data set for a selected portion of the video stream comprising labels for one or more objects identified in the selected portion of the video stream;
    select one or more of a configuration for the machine learning model and a computing resource allocation for the plurality of jobs by testing one or more of a plurality of configurations and a plurality of computing resource allocations using an average inference accuracy over the retraining window as a testing metric; and
    operate the machine learning model using the one or more of the configuration and the computing resource allocation selected.

18. The computing device of claim 17, wherein the configuration comprises an inference job configuration and a retraining job configuration, and wherein the instructions executable to select the configuration comprise instructions executable to select:
  the inference job configuration that provides a highest determined inference accuracy within a constraint of keeping up with performing inferences on a live video stream; and the retraining job configuration that provides a highest determined inference accuracy with a retraining duration that does not exceed a duration of the retraining window.

19. The computing device of claim 17, wherein the instructions executable to select the computing resource allocation comprise using a thief algorithm to iteratively allocate computing resources from one or more jobs designated as a victim to a job designated as thief.

20. The computing device of claim 17, wherein the instructions are executable to select the plurality of configurations from a larger set of configurations.

* * * * *